(12) United States Patent
Boyapalle et al.

(10) Patent No.: US 10,073,753 B2
(45) Date of Patent: Sep. 11, 2018

(54) SYSTEM AND METHOD TO ASSESS INFORMATION HANDLING SYSTEM HEALTH AND RESOURCE UTILIZATION

(71) Applicant: Dell Products, LP, Round Rock, TX (US)

(72) Inventors: Anantha K. Boyapalle, Cedar Park, TX (US); Michael S. Gatson, Austin, TX (US); Marc R. Hammons, Round Rock, TX (US); Danilo O. Tan, Austin, TX (US); Nikhil M. Vichare, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 187 days.

(21) Appl. No.: 15/043,615

(22) Filed: Feb. 14, 2016

(65) Prior Publication Data
US 2017/0235622 A1 Aug. 17, 2017

(51) Int. Cl.
*G06F 11/00* (2006.01)
*G06F 11/30* (2006.01)
*G06F 11/34* (2006.01)

(52) U.S. Cl.
CPC ...... *G06F 11/3055* (2013.01); *G06F 11/3065* (2013.01); *G06F 11/3409* (2013.01);
(Continued)

(58) Field of Classification Search
CPC ............. G06F 11/0736; G06F 11/0784; G06F 11/079; G06F 11/263; G06Q 40/08;
(Continued)

(56) References Cited

U.S. PATENT DOCUMENTS 5,107,499 A * 4/1992 Lirov .................. G06F 11/2257
706/911
5,655,081 A * 8/1997 Bonnell .............. G06F 11/0748
709/202
(Continued)

*Primary Examiner* — Bryce P Bonzo
*Assistant Examiner* — Jeison C Arcos
(74) *Attorney, Agent, or Firm* — Prol Intellectual Property Law, PLLC; H. Kenneth Prol

(57) ABSTRACT

A method and information handling system configured to store, via a monitoring system data repository memory device, aggregate information handling system performance telemetry data crowd-sourced from a population of information handling systems and categorized into mapping classifications based on software application inventory and software application associations with drivers and libraries and to execute instructions, via an application processor, of an information handling system diagnostic platform in an intelligent configuration management system to obtain aggregate information handling system performance telemetry data for a performance characteristic of information handling systems having a first mapping classification corresponding to a client information handling system, and to construct, at the management information handling system, a performance characteristic baseline of operation across the aggregated telemetry data for one mapping classification and receive monitored telemetry data for the performance characteristic from the client information handling system and detect abnormal operation if the client information handling system monitored telemetry data for the performance characteristic exceeds a threshold deviation relative to the performance characteristic baseline.

20 Claims, 12 Drawing Sheets

(52) U.S. Cl.
CPC ...... *G06F 11/3452* (2013.01); *G06F 11/3051* (2013.01); *G06F 2201/81* (2013.01)

(58) Field of Classification Search
CPC ........ G06Q 50/22; G06Q 50/24; G06Q 30/06; G06Q 30/0609; G06Q 30/0641; G05B 23/0275

See application file for complete search history.

(56) References Cited

U.S. PATENT DOCUMENTS

| | | | | |
|---|---|---|---|---|
| 6,282,701 | B1* | 8/2001 | Wygodny | G06F 11/3466 702/183 |
| 6,499,114 | B1* | 12/2002 | Almstead | G05B 19/4184 399/26 |
| 6,671,818 | B1* | 12/2003 | Mikurak | G06Q 10/06 714/4.21 |
| 7,237,023 | B2 | 6/2007 | Menard et al. | |
| 8,156,378 | B1* | 4/2012 | Suit | G06F 11/0709 714/26 |
| 8,200,527 | B1* | 6/2012 | Thompson | G06Q 10/0639 705/7.38 |
| 8,200,586 | B2 | 6/2012 | Alam et al. | |
| 8,352,589 | B2 | 1/2013 | Ridel et al. | |
| 8,359,389 | B1 | 1/2013 | Cohen et al. | |
| 8,713,704 | B2 | 4/2014 | Davis et al. | |
| 9,100,311 | B2 | 8/2015 | Ferris et al. | |
| 9,727,440 | B2* | 8/2017 | Suit | G06F 11/3495 |
| 2002/0194304 | A1* | 12/2002 | Cramer | H04L 29/06 709/218 |
| 2003/0065986 | A1* | 4/2003 | Fraenkel | G06F 11/3006 714/47.2 |
| 2003/0079160 | A1* | 4/2003 | McGee | G06F 11/0709 714/39 |
| 2003/0110007 | A1* | 6/2003 | McGee | G06F 11/0709 702/179 |
| 2003/0187696 | A1* | 10/2003 | Bonissone | G06Q 40/08 705/4 |
| 2004/0181685 | A1* | 9/2004 | Marwaha | H04L 41/0686 726/22 |
| 2004/0225381 | A1* | 11/2004 | Ritz | G06F 11/0709 700/26 |
| 2004/0236820 | A1* | 11/2004 | Flocken | G06F 11/0709 709/200 |
| 2005/0060323 | A1* | 3/2005 | Leung | G05B 23/0275 |
| 2005/0114226 | A1* | 5/2005 | Tripp | G06Q 30/06 705/26.35 |
| 2006/0177808 | A1* | 8/2006 | Aosawa | G06F 17/2705 434/322 |
| 2008/0040174 | A1* | 2/2008 | Murthy | G06Q 30/06 709/224 |
| 2010/0318856 | A1* | 12/2010 | Yoshida | G05B 23/024 714/47.1 |
| 2010/0322089 | A1* | 12/2010 | Raja | H04L 41/5009 370/252 |
| 2011/0054964 | A1* | 3/2011 | Anand | G06F 11/3006 714/57 |
| 2011/0119219 | A1* | 5/2011 | Naifeh | H04L 41/0604 706/47 |
| 2011/0145657 | A1* | 6/2011 | Bishop | G06F 11/3495 714/47.1 |
| 2012/0166623 | A1* | 6/2012 | Suit | G06F 11/3006 709/224 |
| 2012/0166874 | A1* | 6/2012 | Bernardez | H04M 1/24 714/26 |
| 2012/0167084 | A1* | 6/2012 | Suit | G06F 11/3495 718/1 |
| 2012/0167094 | A1* | 6/2012 | Suit | G06F 9/5077 718/100 |
| 2013/0227714 | A1* | 8/2013 | Gula | G06F 21/64 726/32 |
| 2014/0025417 | A1* | 1/2014 | Appel | G06Q 10/063114 705/7.15 |
| 2014/0047106 | A1* | 2/2014 | Leung | H04L 43/08 709/224 |
| 2014/0257828 | A1* | 9/2014 | Thornley | G06F 11/00 705/2 |
| 2014/0337277 | A1* | 11/2014 | Asenjo | G06F 17/30592 707/603 |
| 2014/0365662 | A1* | 12/2014 | Dave | G06F 9/45533 709/226 |
| 2015/0188927 | A1* | 7/2015 | Santhi | H04L 63/104 726/4 |
| 2015/0271008 | A1* | 9/2015 | Jain | H04L 41/0686 714/57 |
| 2016/0103559 | A1* | 4/2016 | Maheshwari | G06F 17/30548 715/738 |
| 2016/0103838 | A1* | 4/2016 | Sainani | G06F 3/0488 707/725 |

* cited by examiner

SYSTEM AND METHOD TO ASSESS INFORMATION HANDLING SYSTEM HEALTH AND RESOURCE UTILIZATION

CROSS REFERENCE TO RELATED APPLICATIONS

Related subject matter is contained in co-pending U.S. patent application Ser. No. 14/789,823 entitled "Computing Device Service Life Management," filed on Jul. 1, 2015, the disclosure of which is hereby incorporated by reference.

Related subject matter is contained in co-pending U.S. patent application Ser. No. 14/789,847 entitled "Information Handling System Configuration Parameter History Management," filed on Jul. 1, 2015, the disclosure of which is hereby incorporated by reference.

FIELD OF THE DISCLOSURE

The present disclosure generally relates to information handling systems, and more particularly relates to assessment and management of health and resource management for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
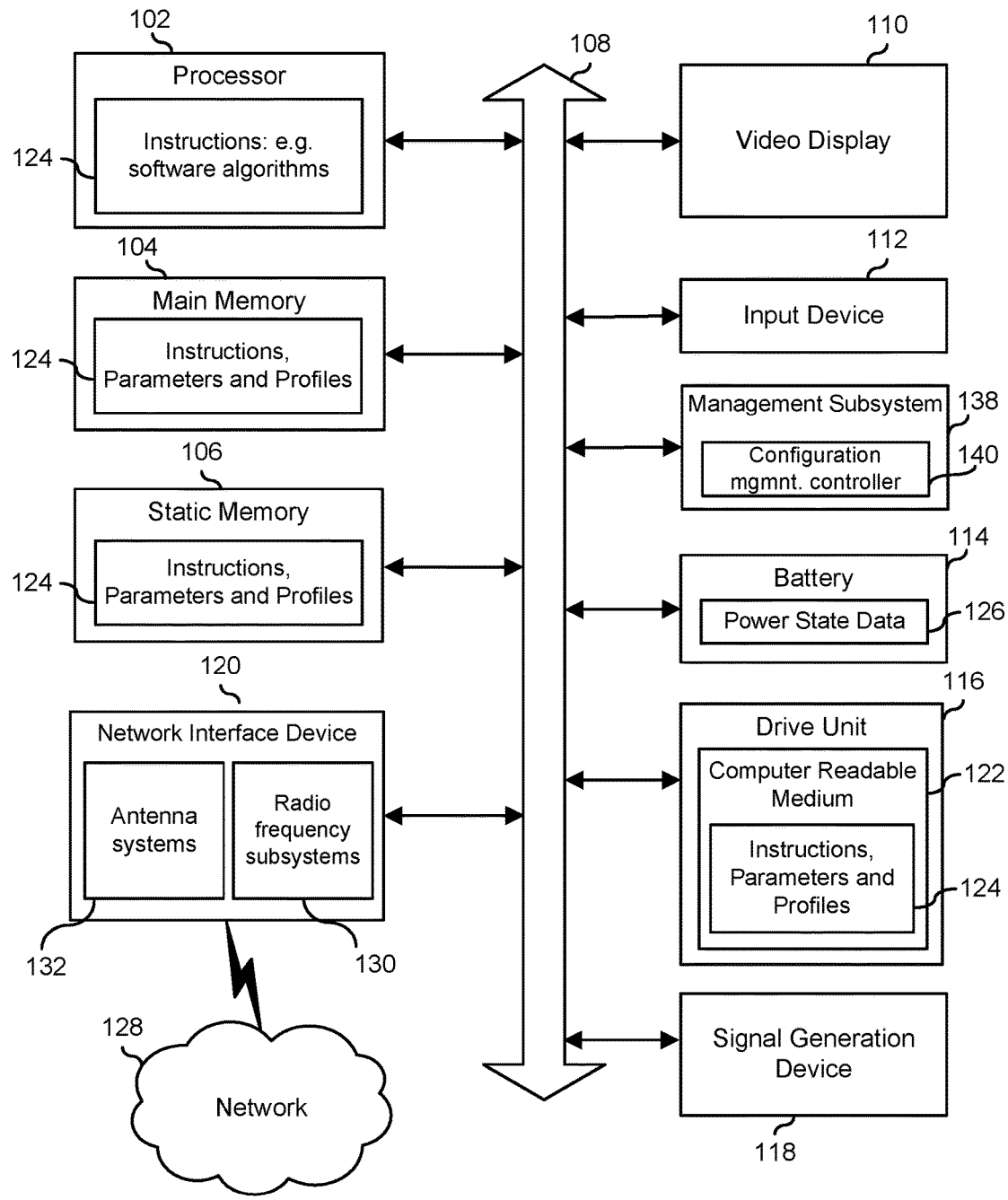
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The performance of information handling systems (IHS) can degrade over time. This may be due to degradation of interaction between software applications and hardware, addition of various software platforms creating conflicts over resources, memory leaks, poor congruity among versions or upgrades of various software applications, drivers, and operating systems, among many other possible factors. Additionally, security issues may contribute to degradation of performance such as system intrusions and viruses as is understood. Current tools allow remote access to analyze individual systems, such as software debugging, to assess current function of those individual information handling systems. Limited aggregation of data from specific sensors or statistical anomalies in network traffic is also sometimes used to detect intrusions or virus behavior as well.

In the present disclosure, a monitoring system data repository is also established to gather monitored performance data across a population of information handling systems. The performance data may relate to a variety of software and hardware performance information detected and recorded at the contributing information handling systems. In one example embodiment, an enterprise or government organization may deploy a large population of systems employing a variety of software and hardware capabilities, but some of which may utilize similar hardware and software resources as well. In another embodiment, a computer manufacturer or leasing entity or an IT services organization may access various types of performance data from systems sold, leased, or under the care or responsibility of the organization. Performance monitoring may use techniques in some embodiments to keep all monitored performance data that is reported to a monitoring system data repository anonymous as to source of the data or shield content of information processed at a contributing information handling system. In other aspects, participation in providing information handling system performance data to a monitoring system data repository may be an opt in selection for users.

An intelligent configuration management system operating an information handling system diagnostic platform may access the monitoring system data repository reported by an information handling system performance monitoring system that monitors and stores data relating to usage of component devices and systems in contributing and client information handling systems. The information handling system performance monitoring system may operate in the background during operation of the contributing information handling system and serve to report back performance, utilization, and configuration information to the monitoring system data repository. Configuration information may include mapping and associations of software applications and firmware applications with drivers, files, libraries (DLLs), registry entries, processes, threads, services, network ports, or hardware for contributing and monitored information handling systems. Additional software telemetry data may be measured including component device resource utilization by software applications.

Detection of hardware inventory and software/firmware inventory for contributing information handling systems is one aspect of monitored performance data that may be crowd-sourced to the monitoring system data repository. Additionally, information on a footprint of resource utilization and linkages among software applications and hardware of contributing information handling systems may also be received. For example, configuration data is also reported including, for example, hardware configuration and changes over time, software changes, operating system (OS) changes, basic input output system (BIOS) changes, historic data on repair, etc. These aspects in addition to performance measurement data across a plurality of information handling systems may be used, as in the present disclosure, to show hardware and software expected for use with establishing baseline performance levels. In an example embodiment, numerous dynamic software behavior trends may be detected for client information handling systems by comparison to the crowd-sourced baseline performance levels adjusted based on mapping and associations of software applications or other configuration factors.

Profile and setting information is generally static, e.g., once default values of user settings are changed, typically based largely on user choice or static workload, the modified settings may continue to be used without much, if any, further change. However, profile and setting changes to an underperforming or abnormally performing client information handling system may, in some cases, result in improved performance. Assessment of software and hardware behavioral performance relative to crowd-sourced baseline performance levels provides for an opportunity in some cases to take full advantage of the capabilities and capacities of a client information handling system, including improvements in performance, power consumption, resource utilization, storage, graphics, etc.

Component device utilization data may be collected via numerous source information handling systems, and relate to operation of numerous hardware functions of each contributing information handling system. Component device utilization data may be retrieved from a variety of sensors including detection of events and usage that may contribute to performance characteristics of the client information handling system and a user's perception of such performance characteristics. Power draw measurements may be conducted on power rails supplying power to individual component devices in the client information handling system or to component devices externally connected to the information handling systems. Power draw measurements can be used to estimate power dissipation and thermal conditions at the individual component devices. Additionally processor activity, controller activity, wireless interface activity, memory/drive activity, and other component activity measurements may also be assessed independently or in connection with power draw measurements. Data representative of events detected by sensors, such as an impact detected by an accelerometer, can be collected. Data representative of events can be detected by system-level sensors, located, for example, on a motherboard of an information handling system, and by component-level sensors, located, for example, at a component, such as a hard disk drive (HDD), of the information handling system. Collected data may be sourced via SMBIOS, Win 32 API, or device drivers to a database repository. An example, hardware implementation monitoring database includes the Dell® Data Vault (DDV) system operational via Windows® or other operating systems. Component device utilization data may be collected and stored on-box locally at a client information handling system, or may be reported remotely to a hub server or servers or a remote data center hosting a DDV or other monitoring system data repository for a plurality of information handling systems.

Monitoring is done via network connection and an information handling system performance monitoring system and an intelligent configuration management system having an information handling system diagnostic platform. Baselines of performance may be implemented on a group level of contributing information handling systems. For example, baselines of performance may be established on an enterprise level via feedback of performance and reliability trends for aspects of information handling systems in the enterprise to enable determination of baseline operation and from that, abnormal information handling system behaviors. In yet other embodiments, sub-groups of contributing information handling systems may fall into defined classifications based on many factors, for example configuration index determinations or business factors, and baselines established for each of the various classification levels. In such an embodiment, baseline operational values may therefore be more accurately estimated with system-level event monitoring, component-level event monitoring, system-level usage monitoring, component-level usage monitoring, and a configuration determination for similarly capable information handling systems or those with similar suites of software applications. Potential software resource conflicts and behavioral trends may then be assessed. Further anomalies and abnormal software or hardware performance may be assessed automatically for client information handling systems compared to baselines or thresholds of performance linked to those baseline performance levels. Additionally, statistical modeling of performance parameter values for sets of information handling systems that fall within a classification based on mappings and association of software applications and configuration may more accurately yield an appropriate determination of abnormal behavior for an individual client information handling system assessed by the information handling system diagnostic platform. In some aspects, the sets of information handling systems may be referred to as mapping classifications or as map classified information handling systems. Those with similar software and firmware applications and established mapping and associations of the software or firmware applications with drivers, files, libraries, registry entries, processes, threads, services, network ports, or hardware are examples of mapping classifications that may be made by the intelligent configuration management system for categorizing crowd-sourced performance metric data. The mapping classifications may include any or all combinations of mapping and association information described above. For example, a mapping classification may include only a software application inventory, driver association data, library associations, and network port associations or may include more or fewer aspects of mapping and association data for an information handling system. Additional aspects may include determinations of hardware and software capabilities and configurations of information handling systems that may provide further granularity for mapping classifications in some embodiments.

System data collected and stored during operation of a contributing information handling systems can be used as a source of data reported on the information handling systems and to the monitoring system data repository. Thus, for example, for a customer's usage and device history may be reported to and stored in a monitoring system data repository (e.g., Dell® Data Vault). Detailed device and overall system usage conditions, event occurrences, and their severity can include, for example, data pertaining to power and duty cycle, system and individual device resource utilization profiles, thermal stress history, system off/storage conditions, mechanical stress counters, etc. may be reported for performance baseline determination by a an intelligent configuration management system operating an information handling system diagnostic platform.

A central information handling system management data repository, which may be referred to as a data vault or a monitoring system data repository, established by an information handling system vendor to store information handling system management data obtained from information handling systems in operation for customers, and can be used for obtaining data from which monitored client system configuration parameter values for a replacement information handling system can be determined. The monitoring system data repository can receive and store data obtained from local instrumentation of a both a plurality of contributing information handling systems and a monitored client information handling system. The central monitoring system data repository can be used to implement monitoring and reporting the physical state of information handling systems, extending basic system capabilities to support predictive health reporting and self-remediation, dynamic resource optimization, and adaptive behavior.

Contributing and client information handling systems can be monitored, for example, from the factory even after the systems have been sold and are being used by customers. Key event and resource usage data can be tracked throughout the life-cycle of the product. In some embodiments, system data and performance may be crowd-sourced to a monitoring system data repository. Measured performance data is one aspect of data reported to the monitoring system data repository for access by a intelligent configuration management system. Measured performance data parameters include measurements taken of information handling system performance metrics including boot times, resume times, power draw during idle times, application start up times, application instruction execution times, application shut-down times, thermal generation, and various hardware and software utilization levels. Examples of performance data to be tracked can include the following: detailed device and overall system usage conditions and severity, system and individual device utilization profiles and parameters for hardware components, power parameter values, battery parameter values, system event parameter values, mechanical event parameter values, thermal parameter values, networking parameter values, processor parameter values, memory parameter values, display parameter values, storage parameter values, connector parameter values, and system configuration parameter values. Power parameters can include, for example, power-on hours (including alternating current (AC) power-on hours, battery power-on hours, and the sum of those hours), power cycles, hibernate and sleep state requests, time in sleep states, and duty cycles. Battery parameters can include, for example, relative state of charge (RSOC), charging current, voltage, power, battery cycles, temperature, current drawn, and full charge capacity. System event parameters can include, for example, system thermal events, hardware and operating system (OS) system failure events, motherboard (MB) free fall events, and system-off conditions, such as storage conditions. Mechanical event parameters can include, for example, mechanical cumulative stress counters (accelerometers, free fall, hinge cycles, connector cycles, docking cycles, etc.). Thermal parameters can include, for example, central processing unit (CPU), motherboard, graphics, and memory temperatures, fan revolutions per minute (RPM) parameters, and thermal stress history. Networking parameters can include, for example, percentages of activity for wired and wireless network adapters. CPU and memory parameters can include, for example, memory usage, CPU usage and throttling, and paging activity. Display parameters can include, for example, brightness values and a number of displays. Storage parameters can include, for example, hard disk drive (HDD) parameters such as percentages of time in idle, read, and write states, Self-Monitoring, Analysis, and Reporting Technology (SMART) logs, and HDD free space. HDD parameters can include parameters pertaining to a rotating magnetic or optical disk or to a solid-state memory storage device, such as a flash memory drive. Connector parameters can include, for example, connection status of internal connectors. System configuration parameters can include, for example, a service tag, system type, basic input output system (BIOS) version, hard disk drive (HDD) size and model, battery size, operating system (OS), random access memory (RAM) size, etc. System configuration parameters can include, for example, hardware configuration and changes over time, software/operating system (OS) configuration and changes over time, and historic data on repair and service actions.

In one aspect, data such as the above in a monitoring system data repository may be used by the intelligent configuration management system and information handling system diagnostic system to establish baseline performance levels for a single information handling system resource or for a plurality of resources using one or more types of software applications. In another aspect, gathering the above data and records may be used by an intelligent configuration management system to monitor a client information handling system health along with other recorded performance measurements. Since client information handling system health may degrade over time in that performance may become compromised, automatic indications of whether this happens or to what extent it is happening may be useful in management of information handling system performance.

The intelligent configuration management system is software code executable on one or more application processors. The application processors may reside on a client information handling system being monitored by the intelligent configuration management system, may reside at one or more remote servers and database systems. The intelligent configuration management system may operate an information handling system diagnostic platform. The information handling system diagnostic platform may conduct the assessment of system health may include determination of resource utilization and establishing baseline thresholds of operation. Known operational thresholds are used to create models for the information handling system diagnostic platform that may indicate the likelihood of failures or other issues with the operation of a client information handling system. The information handling system diagnostic platform is part of the intelligent configuration management system software executable code or may be its own software operational on one or more information handling systems, including the client information handling systems being assessed.

The information handling system diagnostic platform may be used for notification purposes or to recommend action for repair or reconfiguration of client information handling systems. Actions can include, for example, notification of client information handling system of performance degradation reasons and levels. Other actions may include recommending settings of system configuration parameter values or for operational changes in software applications in a replacement information handling system.

In accordance with at least one embodiment, a method comprises determining abnormal client information handling system performance parameter differences relative to a threshold of performance deviation from a baseline of performance determined by the intelligent configuration management system with an information handling system diagnostic platform. The information handling system diagnostic platform may then determine to apply the new settings to the client information handling system to transform the client information handling system performance to fall within a threshold of deviation from a crowd-sourced performance baseline. In some embodiments, the crowd-sourced performance baselines, or their performance deviation thresholds may be amended or modified due to software or hardware configuration differences. For example, a client information handling system with greater processing, memory, or other resources may be above the normal reporting information handling system and a baseline or threshold of deviation may require adjustment or weighting accordingly. As an example, an battery charge profile can take into account both a need for fast charging and improvements in battery service life, for example, provided by a new generation of battery technology relative to some or all of the reporting information handling systems. As another example, a system with an upgraded solid state disk (SSD) drive or a hybrid drive can make use of cache utilization to set cache size and content appropriate to the client information handling system technology and adjust baselines as related to older memory disk technology. As a further example, a system can make use of upgraded system usage efficiency data to modify sleep settings to take advantage of improvements in power consumption to reduce time in hibernation or deeper sleep states for relative baseline determinations. As yet another example, a system can make use of upgraded high-end graphics usage to increase nits based on brightness or improve video memory utilization relative to baseline levels reported from less sophisticated system. The reverse adjustments are also contemplated whereby crowd-sourced performance data from more sophisticated systems yielding baseline performance determinations may be adjusted in view of a lesser sophisticated client information handling system.

Examples are set forth below with respect to particular aspects of an information handling system diagnostic platform as part of an intelligent configuration management system.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems of FIG. 2 such as 220, 221, 222, and 224 or servers or systems such as 210 located anywhere within network 200, including the remote data center 290 operating virtual machine applications as described herein. The information handling system 100 may also execute code 124 for a hardware implementation monitoring and reporting system, for an intelligent configuration management system including an information handling system diagnostic platform that may operate on servers or systems 210, remote data centers 290, or on-box in individual client information handling systems such as 220, 221, 222, and 224 according to various embodiments herein. In other aspects, intelligent configuration management system agents may operate on client information handling systems such as 220, 221, 222, and 224 to log and collect data relating to component device utilization and other use metrics. For example, power draw of various component devices within the client information handling systems 220, 221, 222, and 224 may be measured and logged in an information handling system performance monitoring system data repository such as a Dell® Data Vault by the intelligent configuration management agent operating on the client information handling system. In some aspects, this component device utilization data may be reported back to a hub server or remote data center operating the intelligent configuration management system in accordance with the disclosure herein. In other aspects, some or all of the intelligent configuration management system may operate on-box at the client information handling system to provide configuration indications and other operations. One or more client information handling systems 220, 221, 222, and 224 may contribute mapping and association data for software applications as well as measured performance metrics as disclosed herein. When such contributions of mapping and association data and measured performance metrics are crowd-sourced to an intelligent configuration management system, those information handling systems may be referred to as contributing information handling systems. Other client information handling systems 220, 221, 222, and 224 may be diagnosed as to operating health in embodiments described herein.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute the intelligent configuration management system with information handling system diagnostic platform as disclosed herein. Additionally, instructions 124 may execute the information handling system performance monitoring system disclosed herein and an API may enable interaction between these application programs and device drivers and other aspects of the information handling system and software instructions 124 thereon. In a further example, processor 102 may conduct processing of component device power utilization data by the information handling system 100 according to the systems and methods disclosed herein. The computer system 100 may operate as a standalone device or may be connected, such as via a network, to other computer systems or peripheral devices.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The disk drive unit 116, and static memory 106, also contains space for data storage such as an information handling system performance monitoring system data. Gathered mapping and association data and performance metrics such as component device utilization data may also be stored in part or in full in data storage 106 or 116 which may serve as some or all of a monitoring system data repository. Further, the instructions 124 may embody one or more of the methods or logic as described herein. For example, instructions relating to the hardware implementation monitoring system, the intelligent configuration management system software algorithms, information handling system diagnostic platform algorithms, or the intelligent configuration management agent may be stored here.

In a particular embodiment, the instructions, parameters, and profiles 124 may reside completely, or at least partially, within the main memory 104, the static memory 106, disk drive 116 and/or within the processor 102 during execution by the information handling system 100. Software applications may be stored in static memory 106 or disk drive 116. Software application footprint data including mappings and associations may be logged and stored in memory such as 106 and 116 as well as measured performance metrics including system performance measurements, component device performance measurements, and software application performance measurements conducted for the intelligent configuration management system. Additionally, configuration policy settings, and configuration parameter value estimation profiles and other aspects relating to the intelligent configuration management system functions may be stored in disk drive 116 or static memory 106. Configuration parameter value estimation profiles may be statistical models of system performance, individual component device performance, performance enhancement value estimations, and configuration index determinations performed by an intelligent configuration management system in some embodiments. Parameters may include aspects of component data utilization data to be analyzed with the intelligent configuration management system. Determined baseline performance characteristic telemetry data metrics and thresholds of deviation from those baseline performance levels may also be stored in disk drive 116 or static memory 106. Configuration policy requirements may be set by an administrator such as an IT department of an enterprise or be automatically triggered based on performance constraint estimations, performance enhancement estimations, and productivity determinations. Component device utilization data in storage may also include data such as component device utilization data measured by the processor 102 for specific component devices or systems during information handling system operation. In some aspects, intelligent configuration management system parameters may include business factor determinations of enterprise critical applications or high importance information handling systems which may impact configuration index determinations or configuration policy implementations. Such profile business factors may govern parameters and policy around configuration parameter value estimations. As examples, a lower level of performance may be tolerable for lower importance information handling systems, while a higher level of performance may be desired for higher importance information handling systems.

The information handling system may include a power source such as battery 114 or an A/C power source. Battery 114 may include a smart battery system that tracks and provides power state data 126. This power state data 126 may be stored with the instructions, parameters, and profiles 124 such as component device utilization data to be used with the systems and methods disclosed herein.

The information handling system may also have a management subsystem 138 with a plurality of information handling system subsystems for control of a plurality of systems. For example, data relative to the configuration of the information handling system may be collected or managed by a configuration management controller 140 such as configuration management unit that may access other elements shown in FIG. 1, for example, via one or more buses 108. In some aspects, system-level events, component-level events, system-level usage data, and component-level usage data can be collected and managed via the configuration management controller 140. In other aspects, event and usage data may also be monitored with respect to component devices of the information handling system. In some aspects where applicable, execution of configuration policy may be administered partially via the configuration management controller 140.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
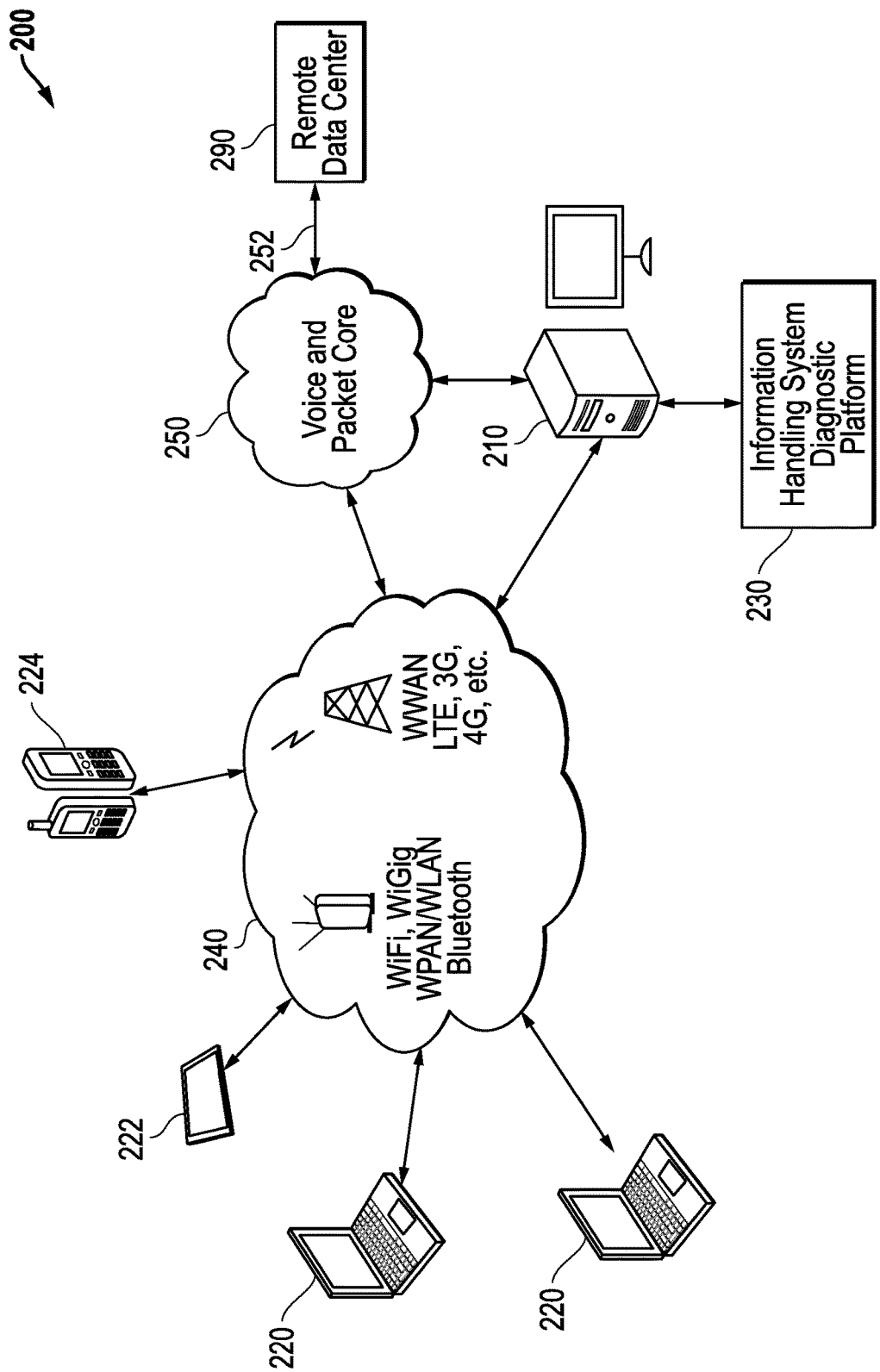
FIG. 2 is a block diagram illustrating a network environment having a plurality of information handling systems according to an embodiment of the present disclosure.

FIG. 2 illustrates a network 200 that can include one or more information handling systems. In a particular embodiment, network 200 includes networked information handling systems 210, 220, 221, 222, and 224, wireless network access points, routers and switches, and multiple wireless connection link options. Systems 210, 220, 221, 222, and 224 represent a variety of computing resources of network 200 including client mobile information handling systems, data processing servers, network storage devices, local and wide area networks, or other resources as needed or desired. In some embodiments, some or all of network 200 may be under control of IT management for a group or enterprise. As specifically depicted, systems 220, 221, 222, and 224 may be a laptop computer, tablet computer, or smartphone device in certain aspects. These user mobile information handling systems 220, 221, 222, and 224, may access a wireless local area network 240, or they may access a macro-cellular network. For example, the wireless local area network 240 may be the wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN or similar wireless network protocols. Alternatively, other available wireless links within network 200 may include macro-cellular connections. Macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 250 may contain externally accessible computing resources and connect to a remote data center 290. The voice and packet core network 250 may contain multiple intermediate web servers or other locations with accessible data (not shown). Connection between the wireless network 240 and remote data center 290 may be via Ethernet or another similar connection to the world-wide-web, a WAN, a LAN, another WLAN, or other network structure. Such a connection via WLAN access point/Ethernet switch to the external network may be a backhaul connection. The wireless access point may be connected to one or more wireless access points in the WLAN before connecting directly to a mobile information handling system or may connect directly to one or more information handling systems 210, 220, 221, 222, and 224.

Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 221, 222, and 224 allowing streamlining and efficiency within those devices. Similarly, remote data center 290 permits fewer resources to be maintained in other parts of network 200.

In an example embodiment, the cloud or remote data center 290 may run hosted applications for systems 210, 220, 221, 222, and 224. This may occur by establishing a virtual machine application executing software to manage applications hosted at the remote data center 290. Mobile information handling systems 220, 221, 222, and 224 are adapted to run one or more applications locally, and to have hosted applications run in association with the local applications at remote data center 290 or applications running on another remote information handling systems such as 210. The virtual machine application may serve one or more applications to each of the network connected information handling systems including 210 and client information handling systems 220, 221, 222, and 224. Thus, as illustrated, systems 220, 221, 222, and 224 may be running applications locally while requesting data objects or submitting data objects related to those applications from or to the remote data center 290 and host information handling system 210 via the wireless network. Similarly, system 210 may be running applications locally while requesting data objects or submitting data objects related to those applications from or to the remote data center 290 and receiving or submitting data objects to client information handling systems 220, 221, 222, and 224 via wireless network 240 or voice and packet core 250. For example, a Dell® Data Vault hardware implementation monitoring and reporting application may run locally at systems 220, 221, 222, and 224 and report data back to a host server system 210. In an embodiment, data may then be stored locally, at host system 210, or at a remote data center 290 relating to system status for client information handling systems 220, 221, 222, and 224. In other words, a central information handling system management data repository, which may be referred to as a data vault or a monitoring system data repository, may be local to host system 210, at remote data center 290, or some combination of the two. Server or host system 210 may also operate an intelligent system configuration management system software in whole or in part in connection with multiple client systems such as 220, 221, 222, and 224. Server or host system 210 may operate to crowd-source mapping and association data, configuration data, and performance metrics. The intelligent system configuration management system software may include an information handling system diagnostic platform 230 for purposes of establishing baselines of operation and thresholds of deviation from baseline operation levels. Information handling system diagnostic platform 230 may also operate to determine abnormal operation of one or more client information handling systems 220, 221, 222, and 224 relative to baseline operation as determined from crowd-sourced data.

Figure 3:
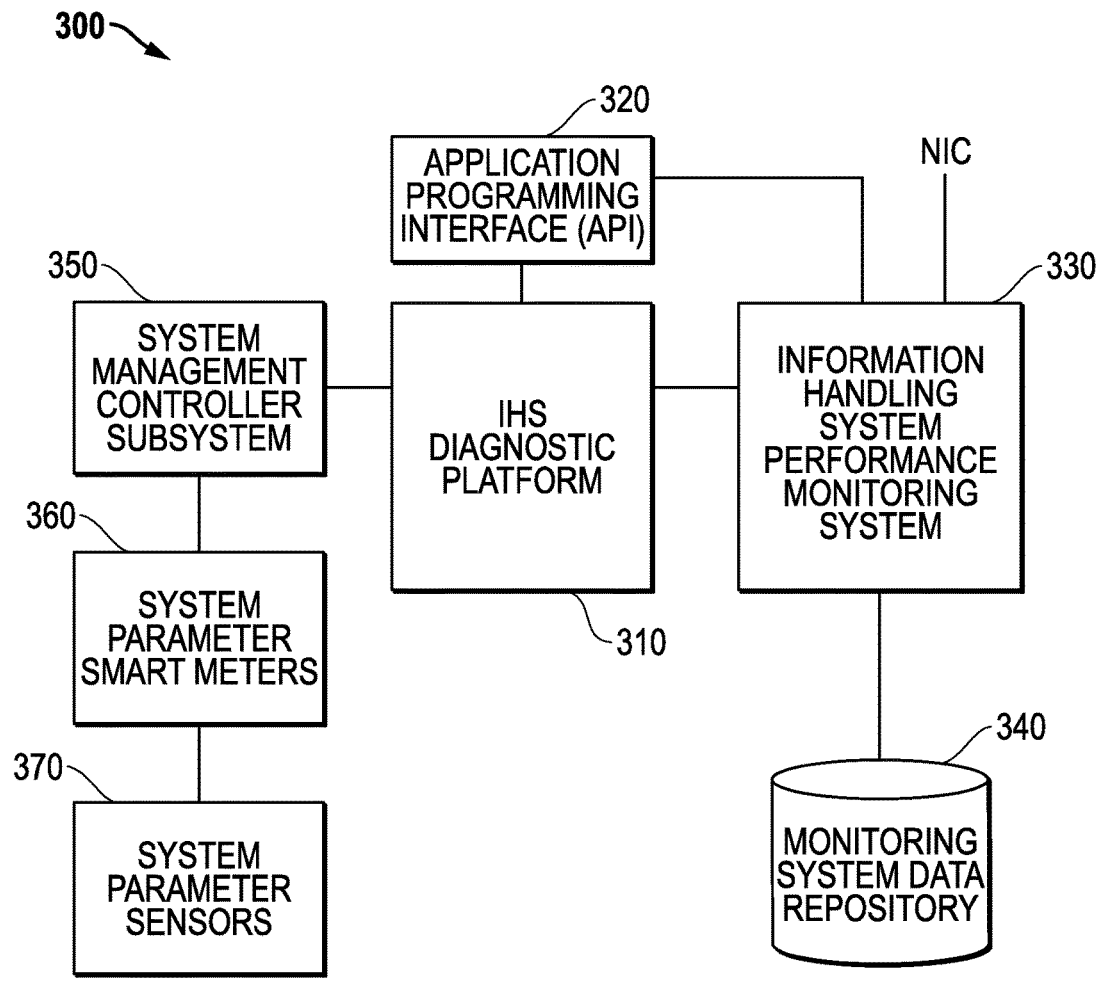
FIG. 3 is a block diagram illustrating components for an aspect of an intelligent system configuration management system with a diagnostic platform according to an embodiment of the present disclosure.

FIG. 3 is a block diagram illustrating components for an aspect of an intelligent system configuration management system according to an embodiment of the present disclosure. The client information handling system of FIG. 3 may execute code to operate an intelligent configuration management system with information handling system diagnostic platform 310 that coordinates collection mapping and association data relating to a list of software or firmware applications operating on the client information handling system and the footprint of drivers, files, libraries, registry entries, processes, threads, services, network ports, or hardware and the like for the list of software or firmware applications. Such data may be used by the intelligent configuration management system to establish mapping classifications for purposes of the information handling system diagnostics.

Figure 9:
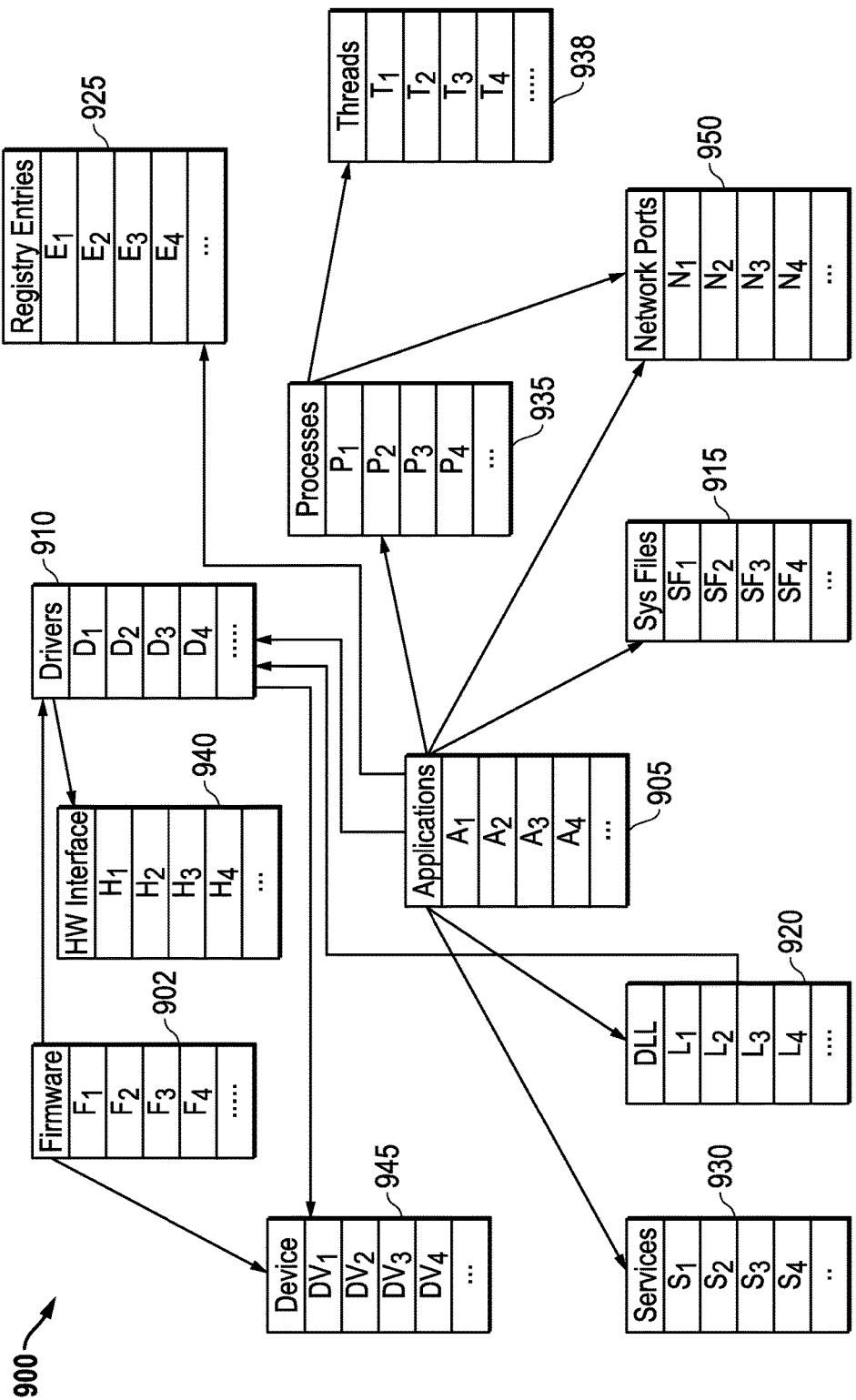
FIG. 9 is a block diagram illustrating an example mapping classification options with software and firmware application mapping and associations according to an embodiment of the present disclosure.

FIG. 9 illustrates options for mapping and association data 900 relating to an inventory of firmware applications 902 or an inventory of software applications 905 for information handling systems contributing crowd-sourced data or client information handling systems under health diagnosis and resource utilization assessment. Firmware application inventory 902 may include a plurality of firmware $F_1 \ldots F_n$. Software application inventory 905 may include a plurality of software applications $A_1 \ldots A_n$. Associations are mapped between firmware components of the firmware application inventory 902 or software application components of the software application inventory 905 and several mapping and association operational components of the information handling system. For example, the mapping classification may involve firmware mapping and associations to various drivers $D_1 \ldots D_n$ 910 and drivers 910 may be further associated with one or more devices $DV_1 \ldots DV_n$ 945. Firmware inventory 902 may also directly be mapped to devices $DV_1 \ldots DV_n$ 945 in example embodiments.

In further examples of mapping and association for information handling systems used for mapping classifications, application inventory 905 may be mapped to drivers $D_1 \ldots D_n$ 910 and drivers 910 may be further associated with one or more devices $DV_1 \ldots DV_n$ 945. Application inventory 905 may also be mapped to system files $SF_1 \ldots SF_n$ 915, libraries (DLL) $L_1 \ldots L_n$ 920, registry entries $E_1 \ldots E_n$ 925, services $S_1 \ldots S_n$ 930, and network ports $N_1 \ldots N_n$ 950. Application inventory 905 association and mapping may also be made to processes $P_1 \ldots P_n$ 935 and processes 935 may be further associated with one or more threads $T_1 \ldots T_n$ 938 and network ports $N_1 \ldots N_n$ 950.

Example data for one software application is shown below. It is understood that several applications operating on an information handling system may have similar mapping and association data for each application. Several listed mapping and association aspects have been abbreviated for the example Dell Support Assist Agent software application for brevity. Some or all of the below may be included within the mapping classification operation in various embodiments.

Application: Dell Support Assist Agent
Services: Dell Support Assist Agent
Processes: 8044 pcdrui.exe
Threads:
   11158 pcdrrealitme.p5x
   10360 appudater.exe
Network Ports:
   pcdrcui.exe TCP 7622
   pcdrcui.exe TCP 7638
   pcdrcui.exe TCP 08.79.184:39596
Drivers: None
HW interface:
   Ethernet adapter Local Area Connection
   Connection-specific DNS Suffix.: us.dell.com
   Description . . . : Intel® Ethernet Connection I218-LM
   Physical Address . . . : EC-F4-BB-6C-7B-41
   DHCP Enabled . . . : Yes
   Autoconfiguration Enabled . . . : Yes
DLLs:— 1394.dll
   many others
System Files
   applauncher.exe
   EnableToolbarW32.exe
   FilterDriverFix.exe
   LogGrabber.exe
   uninstaller.exe
   pcdrui.exe
Registry Entries
   HKCU\Software\Classes\Local Settings\MuiCache\7A8\52C64B7E
   HKLM\SYSTEM\CurrentControlSet\services\ SupportAssistAgent Type REG_DWORD 0x00000010 (16) 2/19/2015 2:39:04 PM 4
   HKLM\SYSTEM\CurrentControlSet\services\ SupportAssistAgent Start REG_DWORD 0x00000002 (2) 2/19/2015 2:39:04 PM 4
   HKLM\SYSTEM\CurrentControlSet\services\ SupportAssistAgent ErrorControl REG_DWORD 0x00000001 (1) 2/19/2015 2:39:04 PM 4
   HKLM\SYSTEM\CurrentControlSet\services\ SupportAssistAgent ImagePath REG_EXPAND_SZ "C:\Program Files (x86)\Dell\SupportAssistAgent\bin\ SupportAssist Agent.exe" 2/19/2015 2:39:04 PM 76
   many others Referring back to FIG. 3, the intelligent configuration management system agent with information handling system diagnostic platform 310 that coordinates collection of event and usage data that can include system-level event data, component-level event data, system-level usage data, and component-level usage data, in a client information handling system.

The intelligent configuration management system agent 310 may coordinate with a system configuration controller sub-system 350 to collect component device utilization data for the client information handling system and association of such component device utilization with software applications operating on the client information handling system. A system configuration controller sub-system 350 may include connection to a plurality of system parameter smart meters 360 situated to detect system parameter values from a plurality system parameter sensors 370 of component devices and systems in the client information handling system in some embodiments. According to one aspect, smart meters 360 may detect power on supply rails to components such as the CPU, GPU, or the full chipset.

Additional component devices including displays, various controllers, both wired and wireless network interface systems, memory, and disk storage systems may have smart meters 360 based on sensors 370 situated to detect system parameter values relevant to configuration of component devices or similar component devices in the client information handling system.

Peripherals among other remotely connected component devices may have intelligent smart meters 360 to report data from system parameter sensors 370 of those information handling system components. In some embodiments, system parameter sensors 370 may be used to identify and measure events and usage relevant to configuration within the information handling system, which may affect performance of the information handling system and a user's perception of such performance. In an aspect, smart meters 360 may monitor system parameter values from the client information handling systems however through peripheral connectors such as USB or similar connections. If this system parameter value measurement for peripherals is not specific to one peripheral, the peripheral component performance levels may be used to provide estimates. Such estimation may be also used for component device system parameter measurements within client information handling systems that may not be outfitted with a complete array of smart meters for component devices in other aspects of the disclosure.

A hardware implementation monitoring and reporting system 330 may monitor performance levels and activity levels of the various component devices or systems of a client information handling system. Such a system will also monitor and collect operational activity data and may even include software inventory, software telemetry data, registry history, system parameter event occurrences, hardware inventory and usage measurements. System parameter measurement may be coordinated between the information handling system performance monitoring system 330 and the intelligent configuration management system 310. For operational activity data collected as part of component device utilization data, data points collected may depend on the component device or system being monitored. For example, a processor or controller such as a CPU, utilization factors such as throughput, latency, availability, service times, throttle, ACPI processor states, thread number, processor queue length or other processing performance or utilization measurements may be taken. In some embodiments, system parameter measurement may take place via the system management controller subsystem 350 of a client information handling system. Activity of each of the plurality of component devices is monitored by the information handling system performance monitoring system 330, for example a Dell® Data Vault system. With this information, usage of component devices may be determined by the intelligent configuration management system with information handling system diagnostic platform 310 according to detected activity of the variety of component devices and systems. This usage determination may assess factors including measurements for those component devices.

The intelligent configuration management system with information handling system diagnostic platform 310 may comprise a set of instructions run on CPU or embedded controller in the chipset(s). The intelligent configuration management system and information handling system diagnostic platform 310 interfaces with the application programming interface (API) 320 found in the information handling system software to coordinate various software applications including the hardware implementation monitoring and reporting system 330 and monitoring system data repository 340 for storing component device utilization data. The API 320 may further coordinate the intelligent configuration management system application agent 310, the monitoring and reporting system 330, system parameter smart meters 360, system parameter sensors 370, device drivers of various component devices, and other system performance sensors linked with the hardware implementation monitoring system. The API 320 may also coordinate with the system management controller sub-system 350 and also other system management controllers in various embodiments. These aspects work together to monitor system events, component events, system usage, component usage, and other component device utilization measurements in the one or more client information handling systems of a group or enterprise. Component usage and other usage measurements comprise part of the component device utilization data that is reported back to a centralized intelligent configuration management system. In some aspects, the centralized intelligent configuration management system may coordinate event and usage data across an enterprise or other group of information handling system users. For example, the hardware implementation monitoring and reporting system 330 may report component device utilization data via a network interface (NIC) as shown. The reporting may be ongoing, periodic, or in response to requests for data from the intelligent configuration management system operating remotely at a hub server or remote data center. Any method of data reporting to a centralized intelligent configuration management system is contemplated. The component device utilization data recorded for client information handling systems is also granular in that it may be broken down by component devices within the client information handling systems. Component device utilization data may also be coordinated with operational measurements to identify trends in operation and habits of users and client information handling systems as discussed further herein. Other data may be recorded as well. This may include time/date data, global positioning system information, usage of AC power sources versus battery usage, and the like. This data may also be included in component device utilization data as well as identifying information relating to the client information handling systems that are part of the enterprise or group.

In some embodiments, an intelligent configuration management system and information handling system diagnostic platform may also operate on-box in one or more client information handling systems. In such an embodiment, the monitoring system data repository 340 having component device utilization data may be utilized by the on-box information handling system diagnostic platform 310 to prepare event and usage data specific to the client information handling system. In such cases, crowd-sourced data from other client information handling systems, such as a similarly situated mapping classification of information handling systems having similar software applications with mappings and associations, may be received by the client information handling system hosting an on-box information handling system diagnostic platform of the intelligent configuration management system to assist in analysis.

The hardware implementation monitoring and reporting system 330 may receive data from a plurality of sensor systems. Sensors can include software and hardware detection mechanisms known in the art to determine performance levels or operation activity of the component devices. It may include additional sensors such as orientation sensors, temperature sensors, data throughput or processing detection systems, and other component device performance detection systems. Orientation sensors, for example, may include one or more digital gyroscopes, accelerometers, and magnetometers in example aspects. As another example aspect, temperature sensors may include thermistors or other temperature sensing systems. Sensor system data may be accumulated at an accumulator sensor hub.

Figure 4:
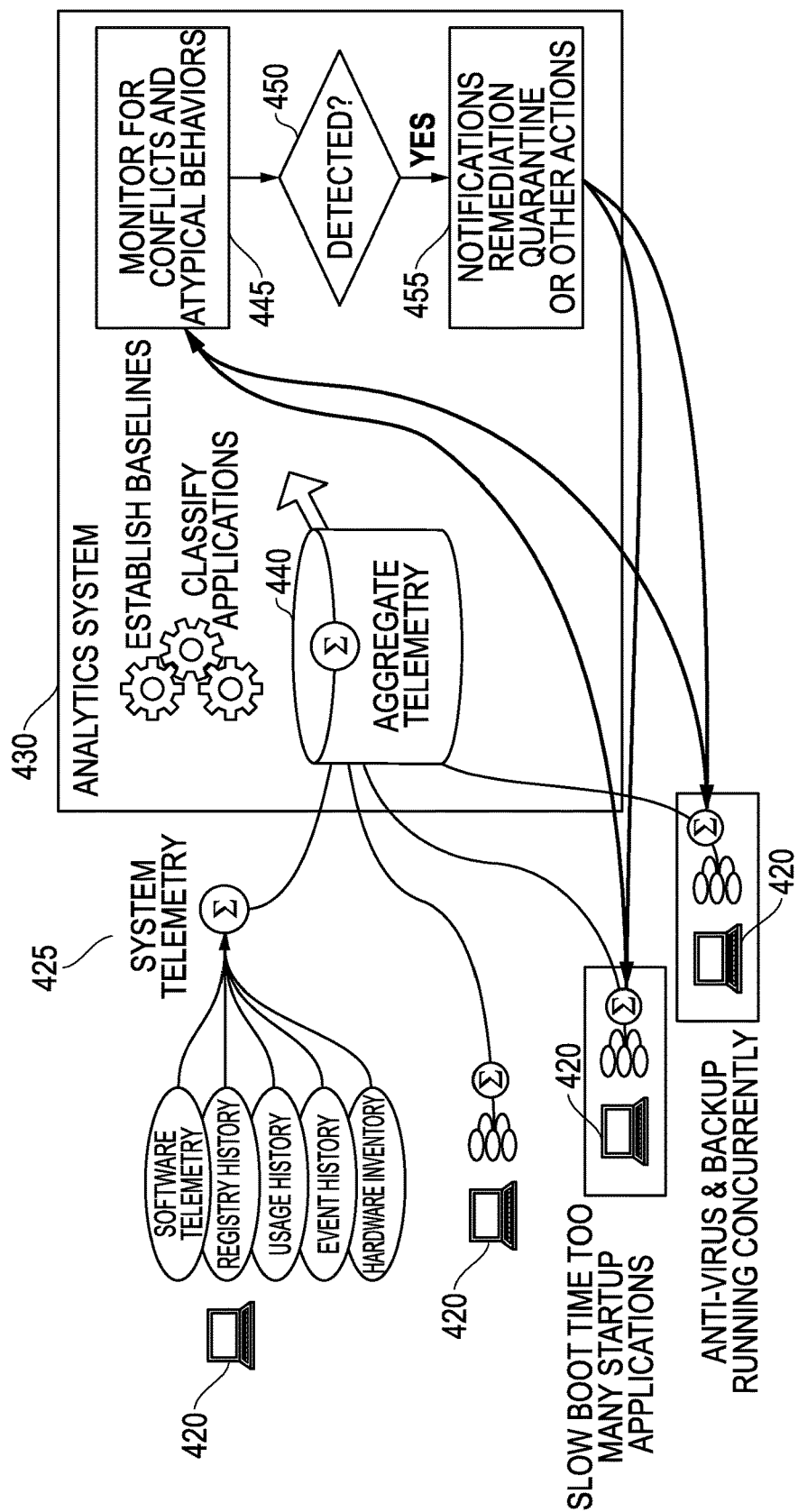
FIG. 4 is a block diagram illustrating an information handling system configuration management and diagnostic assessment system according to an embodiment of the present disclosure.

FIG. 4 is a flow diagram illustrating a method of information handling system configuration management according to an embodiment of the present disclosure.

FIG. 4 illustrates a plurality of contributing information handling systems 420. In the example embodiment, each of the contributing information handling systems provides system telemetry 425. In an example embodiment, telemetry data may be provided by a hardware implementation monitoring and reporting system working in connection with an intelligent configuration management system as described above in FIG. 3. The method in FIG. 4 is described, by way of illustration, with respect to an example group of system telemetry data including software telemetry, registry history, usage history, event history and hardware inventory relative to software applications on information handling systems 420. It is understood that additional system telemetry aspects including mapping and association data as well as measured performance characteristic telemetry data metrics described above may be provided and utilized. It should be further understood that method may be performed with respect to any combinations mapping and association data as well as measured performance characteristic telemetry data metrics described above.

The system telemetry data 425 is gathered and submitted to the analytics system 430 for storage with aggregate telemetry data 440 from the plurality of information handling systems 420. In an example embodiment, the analytics system includes the intelligent configuration management system having an information handling system diagnostics platform as described above with respect to FIG. 3. The information handling system diagnostic platform 430 will establish mapping classifications based on mapping and association data received to classify contributing information handling systems 420 based on software inventory on those systems and those software application associations as described above.

With mapping classifications established, the information handling system diagnostic platform 430 may establish baselines for operational levels one or more measured performance characteristic telemetry data metrics as described above in one example embodiment. Example embodiments of measured performance characteristics include boot time and shutdown time for information handling systems, start up time for applications, execution time for software application functions, and various hardware resource utilization levels for a software application inventory among other described above. In one embodiment, an average or median of measurements from individual contributing information handling systems may be taken as part of the aggregate telemetry 440. In other embodiments, a population distribution of performance characteristic measurements from individual contributing information handling systems may be crowd sourced to the aggregate telemetry 440.

A baseline of operation level is established for the measured performance characteristic telemetry data metrics. In one example embodiment, a population distribution of crowd-sourced performance characteristic telemetry data metrics is used to establish baseline levels of operational performance of those performance characteristics measurements across contributing information handling systems 420. The baseline in some embodiments may be the statistical distribution itself whereby a client information handling system measured performance characteristic may fall within some level of a bounded population distribution. The population distribution may be bounded at one end or both ends at 99%, 95%, 90% or the like. This may be done by establishing an outlier threshold limitation such as by applying a population distribution bars at 95% of the data or population bars between 5% and 95% of the population data. The measured client information handling system performance characteristic may be determined to fall at a percentage within the bounded statistical population distribution from the information handling systems 420. For example, it may be determined that a client information handling system has a CPU utilization level that falls at the 20% level for the population of mapping classification of contributing information handling systems 420. The level of operational performance may be reported as a health statistic, for example, to a client information handling system. The actual CPU utilization level or other performance metric may be reported in some embodiments and provided with some reference operational level. In an aspect, a level of 20% within the population distribution should fall within a normal behavior range for this performance characteristic. Outliers may be deemed abnormal operation or an atypical behavior.

At this juncture, a baseline may also be established by taking an average or median of the population of performance metrics in some embodiments. From that average or median value, the information handling system may apply a statistical deviation from the mean or median value as an acceptable threshold for determining abnormal measured behavior. The statistical deviation from a mean or average may be at any level. Any statistical deviation level may be applied to the contributing information handling system telemetry data to determine thresholds for abnormal or atypical behavior. In some performance metrics example embodiments, such as measured boot times, shut down times, execution times, or the like, the statistical deviation may be an upper bound on time elapsed since faster times would be desirable. It may be that deviation of no more than 10% or some other amount above the average or median value is acceptable and that may be determined to be a threshold. The statistical deviation from a mean or median value may be set depending on desired sensitivity for determining abnormal or atypical behavior. In other example embodiments, a range threshold near the average or mean performance metric may be desirable.

The information handling system diagnostic platform 430 may also determine software conflicts that may be causing abnormal behavior by viewing which software applications may be causing abnormal performance metrics at the same time. The information handling system diagnostic platform 430 may monitor abnormal or atypical behaviors at 445 and monitor conflicts of operation of software applications in the client information handling system relative to similarly mapping classified information handling systems. If the atypical behavior is detected at 450, the system may issue notification of health of operation or abnormal operation at 455. In some circumstances, when conflicts of software applications utilizing resources or causing abnormal performance levels for performance characteristics, remediation to an IT department, a quarantine recommendation, or other action may be triggered. In some embodiments, a statistical confidence level may need to be reached for measured abnormal behavior of a performance characteristic before action is recommended.

In the example embodiments, two contribution information handling systems 420 are also client information handling systems of the information handling system diagnostic platform 430. Feedback is shown in FIG. 5 illustrating two embodiments of detected abnormal behavior and determined conflicts. In one shown example embodiment, a boot time has been detected that falls beyond the statistical abnormal behavior threshold. The information handling system diagnostic platform 430 further determined that at startup more applications than in typical contributing information handling systems are initiated. In a second embodiment, the information handling system diagnostic platform 430 has determined that anti-virus software and backup system software run concurrently creating a conflict and competition for one or more hardware resources causing utilization levels or latencies that exceed a threshold level.

Figure 5A:
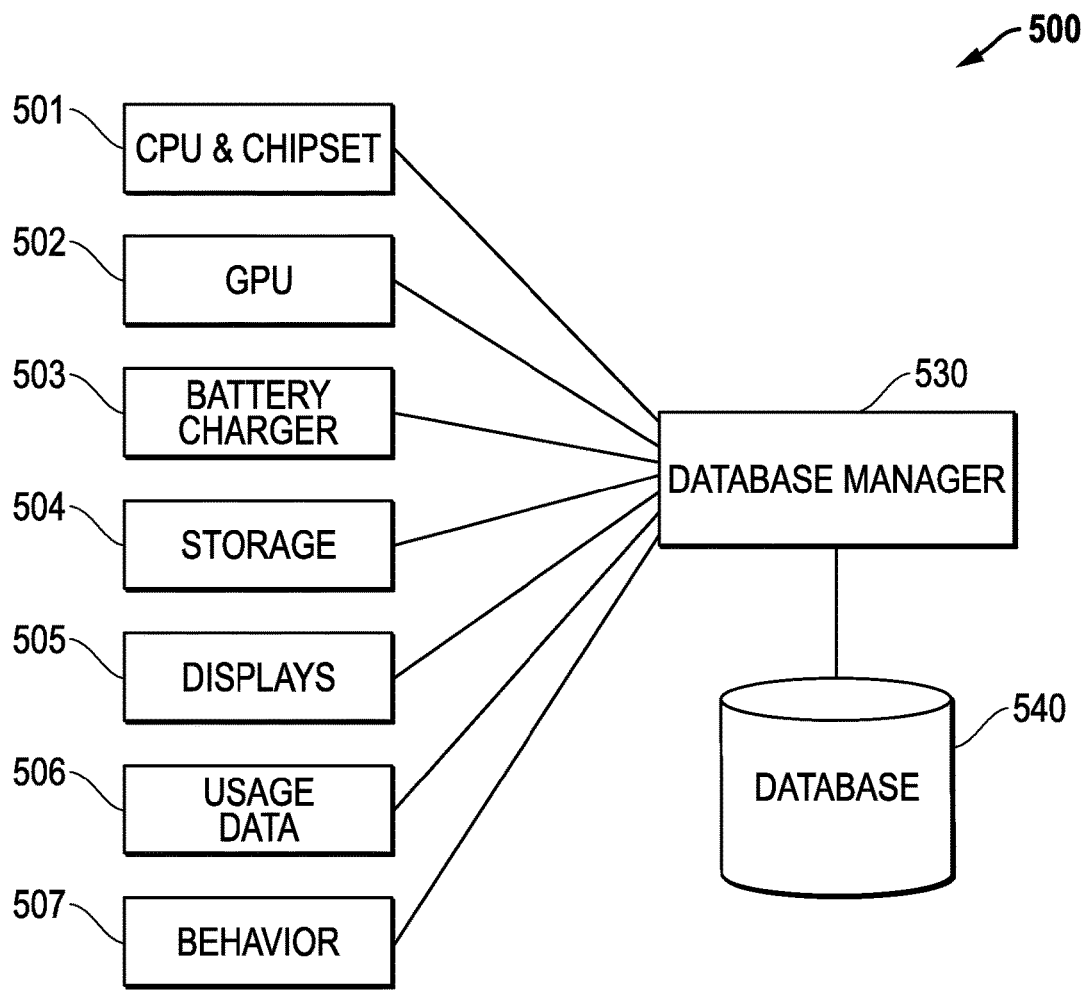
FIG. 5A is a block diagram illustrating components for another aspect of an intelligent configuration management system according to an embodiment of the present disclosure.
Figure 5B:
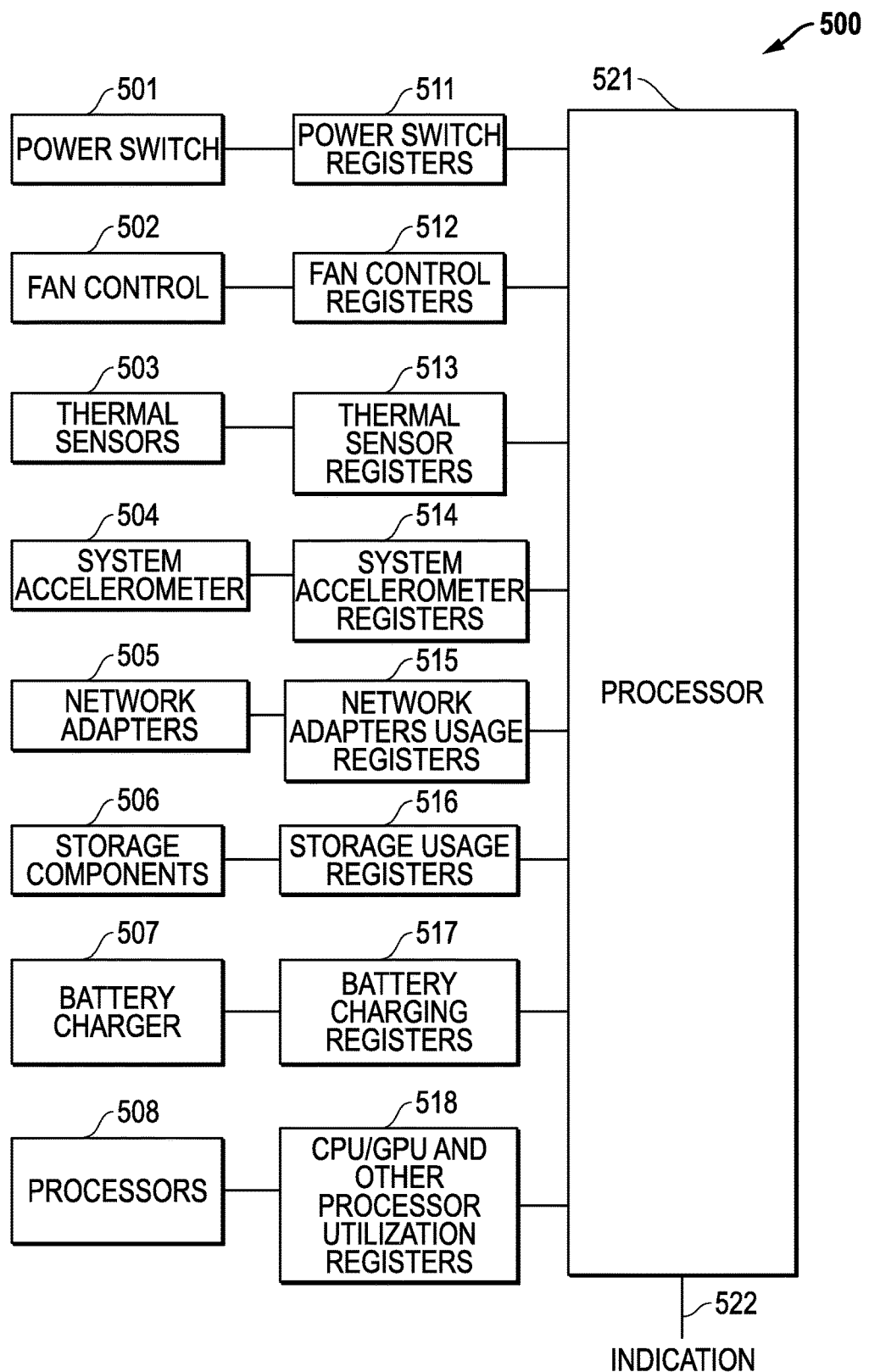
FIG. 5B is a block diagram illustrating components for another aspect of an intelligent configuration management system according to an embodiment of the present disclosure.

FIG. 5A and FIG. 5B illustrate block diagrams of measured performance characteristics at contributing information handling systems and at client information handling systems of the information handling system diagnostic platform for comparison.

FIG. 5A illustrates by graphic depiction the process of component device historical usage data collection including collection of usage and configuration information for use via the intelligent configuration management system of the present disclosure. Components, which can include, for example, CPU & chipset 501, GPU 502, battery charger 503, storage 504, displays 505, usage data 506, and behavior information 507, and other configuration parameter values are coupled to database manager 530. Database manager 530 is coupled to database 540. The assortment of component devices or systems monitored for events and usage affecting performance and configuration is shown at 501 through 507 and measurements may be reported to and stored in a monitoring system data repository. In an example embodiment, the database may work parallel to or be part of the hardware implementation monitoring database such as the Dell® Data Vault (DDV) system. The present embodiment may include power measurements made from power supply rails to component devices including the CPU, chipset, GPU, battery charger, storage/drive devices, displays, and other component devices as described above. Each monitored client information handling system, as described, may have intelligent configuration management system agents conduct event and usage data collection. The monitoring and reporting system operating on the monitored client information handling system may report event and usage data and other component device utilization data back to the centralized intelligent configuration management system and the monitoring system data repository. Other components, such as peripherals or network connected devices operating via the client information handling system may not have event and usage measurement of their own available. In such cases, usage and performance estimates may be made based on duty cycle of power consumption, component device operation, or monitoring of total system events and usage data and configuration parameter values.

Intelligent configuration management system assesses overall event and usage data for the various component devices of the contributing and client information handling systems for the information handling system diagnostic platform. The event and usage data along with additional component device utilization data may be used to determine time-series data representing usage and performance estimations according to statistical models applied. In an example embodiment for a monitored client information handling system, component device power consumption measurements may be summed to provide a total power consumption level. Data from a plurality of client information handling systems may be then summed or extrapolated across a population of contributing information handling systems in accordance with operation of the information handling system diagnostic platform described herein.

FIG. 5B is a graphical chart illustrating another example of contributing and client information handling system architecture for performance characteristic estimation and configuration parameter values according to an embodiment of the present disclosure. An example of a contributing or client information handling system 500 in accordance with such an embodiment comprises power switch 501, fan control 502, thermal sensors 503, system accelerometer 504, network adapters 505, storage components 506, battery charger 507, processor utilization sensor 508 and sensors and other data sources. Client information handling system 500 may also comprise power switch registers 511, fan control registers 512, thermal sensor registers 513, system accelerometer registers 514, network adapter usage registers 515, storage usage registers 516, battery charging registers 517, and CPU/GPU or other processor utilization sensor registers 518 as data registers. Client or contributing information handling system 500 comprises processor 521, which monitors the sensors and other data sources via their respective registers and provides indication 522. Information from sensors and other sources 501-508 of a legacy information handling system, as can be obtained by processor 521 via registers 511-518, can be used to provide indications, such as indication 522, of performance characteristic measurement levels for information handling systems falling within a mapping classification. Additional performance characteristic measurements may be similarly received for the information handling system diagnostic platform. Those are described in additional detail elsewhere herein but may include information handling system boot times, system shut down times, software application start-up and shut down times, software application instruction execution times or latencies, I/O data flow operation or latencies, resume time from sleep states, event log frequency, and software application or system crash occurrences. This data may be used as described above with respect to the information handling system diagnostic platform described in the disclosure herein.

Figure 6A:
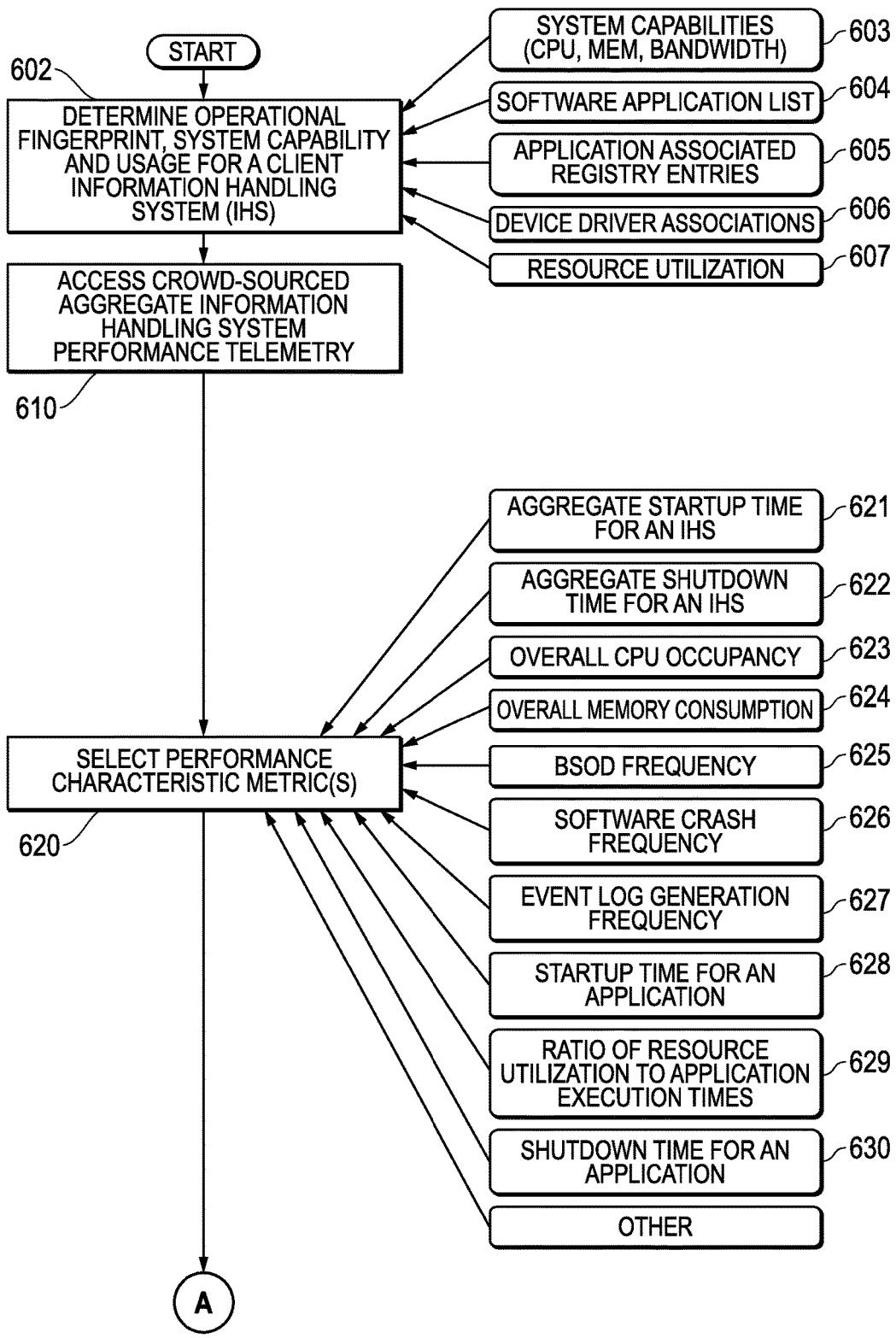
FIG. 6A is a flow diagram illustrating a method of information handling system abnormal operation determination according to an embodiment of the present disclosure.
Figure 6B:
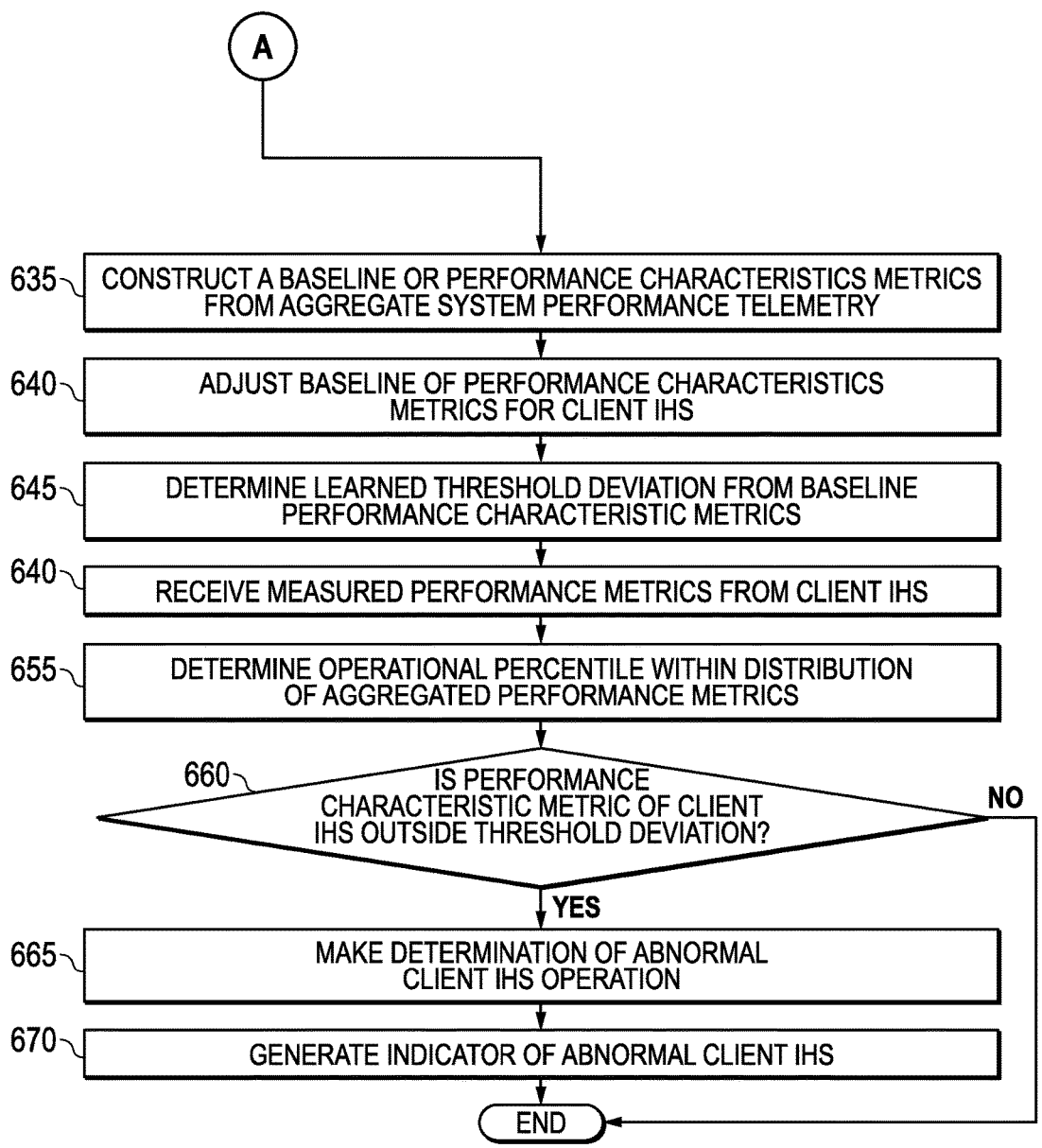
FIG. 6B is a flow diagram illustrating a continuation of the method of information handling system abnormal operation determination of FIG. 6A according to an embodiment of the present disclosure.

FIGS. 6A and 6B are a flow diagram illustrating a method of operation of an information handling system diagnostic platform for one or more client information handling systems using crowd-sourced baseline data received from across a plurality of contributing information handling systems. The client information handling systems may also be contributing information handling systems in some aspects. The contributing information handling systems may be associated with a group or enterprise according to an embodiment of the present disclosure.

The method begins in block 602. In block 602, mapping and association data yielding an operational fingerprint is determined for a client information system. As an example, the operational fingerprint may include a software inventory 604. The operational fingerprint may also include data mapping software applications to associated registries 605, drivers 606, files, libraries, processes, threads, services, or network ports and other hardware associations 607. In some embodiments, the application-associated registry entries, device driver associations, or hardware resource utilization 607 by software applications may be assessed separately or collectively in any combination. The mapping and association data for the software inventory may be used to establish a mapping classification for the client information handling system. In some embodiments, the mapping and association data may further include the client information handling system hardware capabilities 603 such as CPU, GPU, memory capacities, I/O and network bandwidths among others.

An example of mapping classification determined by an intelligent configuration management system for information handling system diagnostics may include a software inventory 604 and mapping/association information for the software applications as shown in TABLE 1 below.

Mapping and association data populating the mapping configuration M1 of TABLE 1 relates to that shown in the example mapping embodiment of FIG. 9. It is understood that variations on the mapping configuration depicted in TABLE 1 are contemplated including variations on types of data considered for columns of TABLE 1.

TABLE 1

Mapping Configuration (Map ID - M1)

| Apps. | Services | Processes | Threads | Drivers | DLL | Firmware | Sys. Files | Registry Entries | HW Interface | Network Ports |
|---|---|---|---|---|---|---|---|---|---|---|
| A1 | S1 | P1 | T1 |  | L1 |  | SF2 | E1 | H1 |  |
| A1 | S1 | P1 | T2 |  | L1 |  |  | E1 | H2 |  |
| A2 |  | P16 | T5 | D1 | L1 | F11 |  | E2 |  | N1 |
| A2 |  |  | T6 |  | L2 |  |  | E3 |  |  |
| A2 |  |  | T7 |  | L3 |  |  |  |  |  |
| A3 | S8 |  | T11 | D2 | L2 |  | SF9 | E4 |  |  |
| A3 | S8 |  |  |  | L2 |  |  | E4 |  |  |

In other aspects, different software inventories or different mapping and associations by client information handling system software applications may yield other mapping classifications for different client information handling systems undergoing diagnostics. In another example mapping classification, an additional software application A4 to the above mapping classification M1 of TABLE 1 would yield a new mapping classification the embodiment shown below for Mapping ID M2 in the embodiment of TABLE 2 below. In one example embodiment, an operating anti-virus software with its own mapping to drivers, files, libraries, registry entries, processes, threads, services, network ports, or hardware could yield a new mapping classification. The new mapping classification may apply to a different information handling system, or may reflect changes to an information handling system such as installing an new software application. Another example embodiment mapping classification table is shown in TABLE 2.

TABLE 2

Mapping Configuration (Map ID - M2)

| Apps. | Services | Processes | Threads | Drivers | DLL | Firmware | Sys. Files | Registry Entries | HW Interface | Network Ports |
|---|---|---|---|---|---|---|---|---|---|---|
| A1 | S1 | P1 | T1 |  | L1 |  | SF2 | E1 | H1 |  |
| A1 | S1 | P1 | T2 |  | L1 |  |  | E1 | H2 |  |
| A2 |  | P16 | T5 | D1 | L1 | F11 |  | E2 |  | N1 |
| A2 |  |  | T6 |  | L2 |  |  | E3 |  |  |
| A2 |  |  | T7 |  | L3 |  |  |  |  |  |
| A3 | S8 |  | T11 | D2 | L2 |  | SF9 | E4 |  |  |
| A3 | S8 |  |  |  | L2 |  |  | E4 |  |  |
| A4 | S3 |  | T4 | D2 | L2 |  | SF7 | E5 |  |  |
| A4 | S3 |  | T5 |  | L4 |  |  | E5 |  |  |

In a broad population of contributing information handling systems, such a mapping classification distinction may be useful to provide improved accuracy of data yielded relating to client information handling system health diagnostics. Upon determination of a mapping classification of the client information handling system undergoing the process of the information handling system diagnostic platform disclosed, the system proceeds to 610. In one embodiment, a population of information handling systems may be those under control of an enterprise or other organization. In such an example embodiment, many of enterprise contributing information handling systems may have similar mapping and association data yielding similar operational fingerprints. Thus, data from similar mapping classified enterprise systems may be particularly useful in determining baseline performance levels as described further herein.

At 610, the information handling system diagnostic platform may access crowd-sourced aggregate telemetry for information handling system performance characteristics. The intelligent configuration management systems and information handling system diagnostic platform may have already amassed aggregate performance metric data for one or more mapping classified contributing information handling systems. Data for such crowd-sourced performance characteristic measurements, as described above in various example embodiments, may be drawn from a mapping category or from mapping categories that have similarities in aspects such as similar software inventories. Thus, the crowd sourced data for performance characteristics has more relatedness to a client information handling system undergoing diagnostics.

At 620, the information handling system diagnostic platform may select at least one performance characteristic measurement from the mapping classification crowd-sourced performance telemetry data. Numerous example performance characteristics may be tracked by the intelligent configuration management system across a population of contributing information handling systems.

In the present embodiment, the information handling system diagnostic platform may select from among several performance characteristic telemetry data metrics. Those performance characteristic telemetry data metrics may include aggregate startup times 621 for contributing information handling systems in a mapping classification in one embodiment. The aggregate startup times 621 may be in the form of median or average start up times or boot times for each contributing information handling system. In other embodiments, the aggregate start up times 621 may be a population distribution of measured startup times for contributing information handling systems. In yet another embodiment, the population distribution of aggregate startup times 621 may be a statistically bounded population distribution of measured start up times.

Another performance characteristic telemetry data metric may aggregate shut down times 622 for contributing information handling systems. In each of the discussed performance characteristic telemetry data metrics, data may be in the example formats or statistical distributions discussed herein. Overall CPU occupancy or utilization 623 and overall memory consumption or utilization 624 may be selected by the information handling system diagnostic platform. Blue screen system crashes (BSOD) 625 may be assessed for frequency, software application crash frequency 626, and event log generation frequency 627 may be other example performance characteristic telemetry data metrics that may be selected at 620. In yet another example embodiment, start up times for software applications 628 and shut down times for software applications 630 may serve as performance characteristic telemetry data metrics. Other metrics as described above may also be selected a performance characteristic telemetry data metrics. For example, any hardware resource utilization levels including processor utilization, memory utilization, I/O utilization, or network adapter bandwidth utilization may serve as performance characteristic telemetry data metrics. In addition, such metrics may play a part of determination of performance characteristic telemetry data metrics. For example, a determination of a ratio of one or more resource utilization metrics to instruction execution times 629 determined for one or more specific software applications in a software application inventory may be used to assess performance for specific software applications on contributing and client information handling systems. Other measured performance characteristic telemetry data metrics may be used as discussed herein or understood by those of skill in the art to reflect performance of information handling system operation. The system may proceed to 635 on FIG. 6B.

FIG. 6B is a continuation flow diagram from FIG. 6A illustrating a method of operation of an information handling system diagnostic platform for one or more client information handling systems using crowd-sourced baseline data. At 635, the information handling system diagnostic platform may establish a baseline of performance for the one or more performance characteristic telemetry data metrics selected at 620. The information handling system diagnostic platform will assess the measured performance characteristic telemetry data from the mapping categorization that corresponds to the client information handling system. A population distribution may be generated of the crowd sourced data for the performance characteristic telemetry data metric and may serve as the baseline reference for behavior of the performance characteristic. In other embodiments, based on the population distribution, a baseline level may be selected from there. For example, the baseline may be selected for system boot times at the $75^{th}$ percentile in one embodiment of a baseline selected form the population distribution. In other example embodiments, a baseline may be established as a mean or median value for mapping classified information handling systems or a value relative to the mean or median value. Selection rules for baseline values, as well as selection of learned thresholds for abnormal behavior determination, may be defined based on desired level of sensitivity for the information handling system diagnostic platform. An example of a baseline determination of data for a performance characteristic telemetry data metric may be shown below in TABLE 3. The shown table reflects a population distribution for a mapping classification M1 and M2. Data in such distribution baseline determinations is mere exemplary for purpose of discussion. The baselines depicted below also reflect only three variations on performance characteristic telemetry data metrics from a variety of possible options described in TABLE 3. Various others are contemplated in other embodiments. Additionally, in an aspect, many mapping configurations are contemplated from contributing information handling systems from across a population, but only two mapping configurations are reflected below with exemplary data.

TABLE 3

| | Baselines | | | | | | | | | | | | | | |
|---|---|---|---|---|---|---|---|---|---|---|---|---|---|---|---|
| | Boot Time in sec | | | | | Resume Time in sec | | | | | Power at Idle in Watts | | | | |
| Maps | 5th | 25th | 50th | 75th | 95th | 5th | 25th | 50th | 75th | 95th | 5th | 25th | 50th | 75th | 95th |
| M1 | 5 | 15 | 20 | 40 | 120 | 2 | 6 | 8 | 25 | 100 | 2.2 | 2.9 | 3.4 | 3.9 | 4.8 |
| M2 | 9 | 18 | 27 | 45 | 136 | 3 | 8 | 12 | 27 | 110 | 2.3 | 3.1 | 3.6 | 4.2 | 5.1 |
| M3 | | | | | | | | | | | | | | | |
| ... | | | | | | | | | | | | | | | |

Proceeding to 640, in some embodiments a mapping classification may be based on some mapping and association data types, but not all mapping and association data are factored. For example, some systems in a mapping classification may utilize a set of hardware with distinct operational advantages or disadvantages relative to others in the population of the mapping classification. In one example embodiment, some systems may utilize a flash drive as a primary storage device as compared to a disk drive. A flash drive will likely have faster response times upon boot up, upon start-up of applications, and even an impact on times for execution of instructions. Thus, depending on the type of primary storage used by a client information handling system undergoing diagnostics, the baseline (or threshold) may be adjusted accordingly. In the example, a baseline population distribution may be shifted due to the type of primary storage device of a client information handling system under diagnostics. For example, when a client information handling system under diagnosis is determined to use a flash memory for primary storage, a known shift may be applied to the population distribution of boot times, application startup times, system shut down times, and the like. This shift may be cause by re-taking a distribution based on elimination of a portion of the population of the performance metric. For example, slower boot times above a given level, such as the $85^{th}$ percentile, may be eliminated and the population redistributed according to the adjustment when a client information handling system uses a flash memory instead of a disk drive. In other embodiments, the mapping classified data may be tagged with devices using flash memory (or other hardware type) versus those using a disk drive (or a different hardware version) and data may be screened from the mapping classified performance metrics for the hardware type used by the client information handling system under diagnosis.

Proceeding to 645, the information handling system diagnostic platform may determine a learned threshold deviation with respect to the baseline performance characteristic telemetry data metrics. The learned threshold may a threshold determined based from the baseline population of data which is used to indicate abnormal behavior for a measured performance characteristic telemetry data metrics. In one example embodiment, the information handling system takes a mean or median of the distribution of performance characteristic telemetry data metrics and determines a deviation spread amount from the mean or median value. The deviation bar may be bounded on one end, for example at the high end, which may be used as a threshold to indicate abnormal client information handling system operation. For example, as described above, a confidence interval may be used, such as a one-sided upper 90%, 95%, or 99% confidence bound, to establish the performance characteristic telemetry data metric deviation threshold indicating abnormal behavior above this level at the high end of the data distribution. An operational percentile boundary (or interval) may be applied at any level in the data distribution depending on desired sensitivity of the information handling system diagnostic platform for determining abnormal operation. In an example embodiment of TABLE 3 above for boot times, a 95% abnormal performance threshold would be 120s for mapping classification M1 and 136s for mapping classification M2. In yet other embodiments, thresholds may be set by actual values for performance metrics set by an IT administrator for the information handling system diagnostic platform. For example, a set threshold limitation for boot time may be set at 15 seconds, above which behavior is deemed abnormal. Such actual value set thresholds may be based on user research by manufacturers or software providers from usability studies determining thresholds at which performance characteristics typically trigger user annoyance.

At 650, the information handling system diagnostic platform may receive measured system telemetry for a performance characteristic from the client information handling system. In some embodiments, a mean or median of several performance characteristic measurements may be received from the client information handling system under diagnosis. Proceeding to 655, an operational percentile for a performance characteristic telemetry data metric is determined for a client information handling system under diagnosis. By comparison of the measured performance characteristic received from a client information handling system to the baseline population distribution, the operational percentile within the distribution may be determined. For example, CPU occupancy may be measured for a client information handling system falling within a mapping classification at the $40^{th}$ percentile relative to the highest CPU consuming crowd-sourced data points considered (assuming certain outlier data is eliminated). As such, the performance metric of CPU occupancy may be operating within a normal or reasonable range for mapping classified information handling system. In another example, software application instruction execution time or another performance characteristic telemetry data metric may be operating at the $97^{th}$ percentile indicating a potential abnormal behavior.

At decision diamond 660, the information handling system diagnostic platform may determine whether the operational percentile falls outside of a threshold deviation level. In the above example embodiment, the CPU utilization occupancy or other performance characteristic telemetry data metric at the $40^{th}$ percentile in the data distribution likely does not fall outside a threshold deviation. In one aspect, CPU occupancy would have to exceed an operational percentile threshold to trigger an indication of abnormal operation. If the measured performance characteristic telemetry data metric does not fall outside a deviation threshold for abnormal behavior, then the process may end at this point for the assessed performance metric. It is understood, that the information handling system diagnostic system may determine operational percentiles and assess abnormal operation for a plurality of performance characteristic telemetry data metrics using the above method in some embodiments. In other aspects, the information handling system diagnostic platform may provide an ongoing or periodic monitoring of some or all performance characteristic telemetry data metrics for a client information handling system.

In the above case where a performance characteristic telemetry data metric is at the $97^{th}$ percentile and the threshold deviation is set at a lower level, such as $90^{th}$ percentile or lower, the information handling system diagnostic platform proceed to 665 where a determination of abnormal behavior for the client information handling system is determined. In response to the determination of abnormal client information handling system behavior, the information handling system may generate an indicator of which performance characteristic is performing abnormally. In some embodiments, the information handling system may transmit, via a network adapter or other communication system, an indicator of abnormal performance characteristic behavior to an IT administrator or to a user of a client information handling system. In yet other embodiments, the measured performance characteristic level may also be included with the indicator of abnormal client information handling system operation. In yet other embodiments, an indication of the operational percentile level relative to the population distribution of other mapping classified devices may be transmitted as well.

In an aspect, when one performance characteristic is operating in an abnormal operating range, several performance characteristics may be doing the same. In such a case, the information handling system diagnostic platform may make an assessment of abnormal operation for a plurality of performance characteristics and report all determinations of abnormal behavior or abnormal operation in one indication to an IT administrator or user. At this point, the process may end.

Figure 7A:
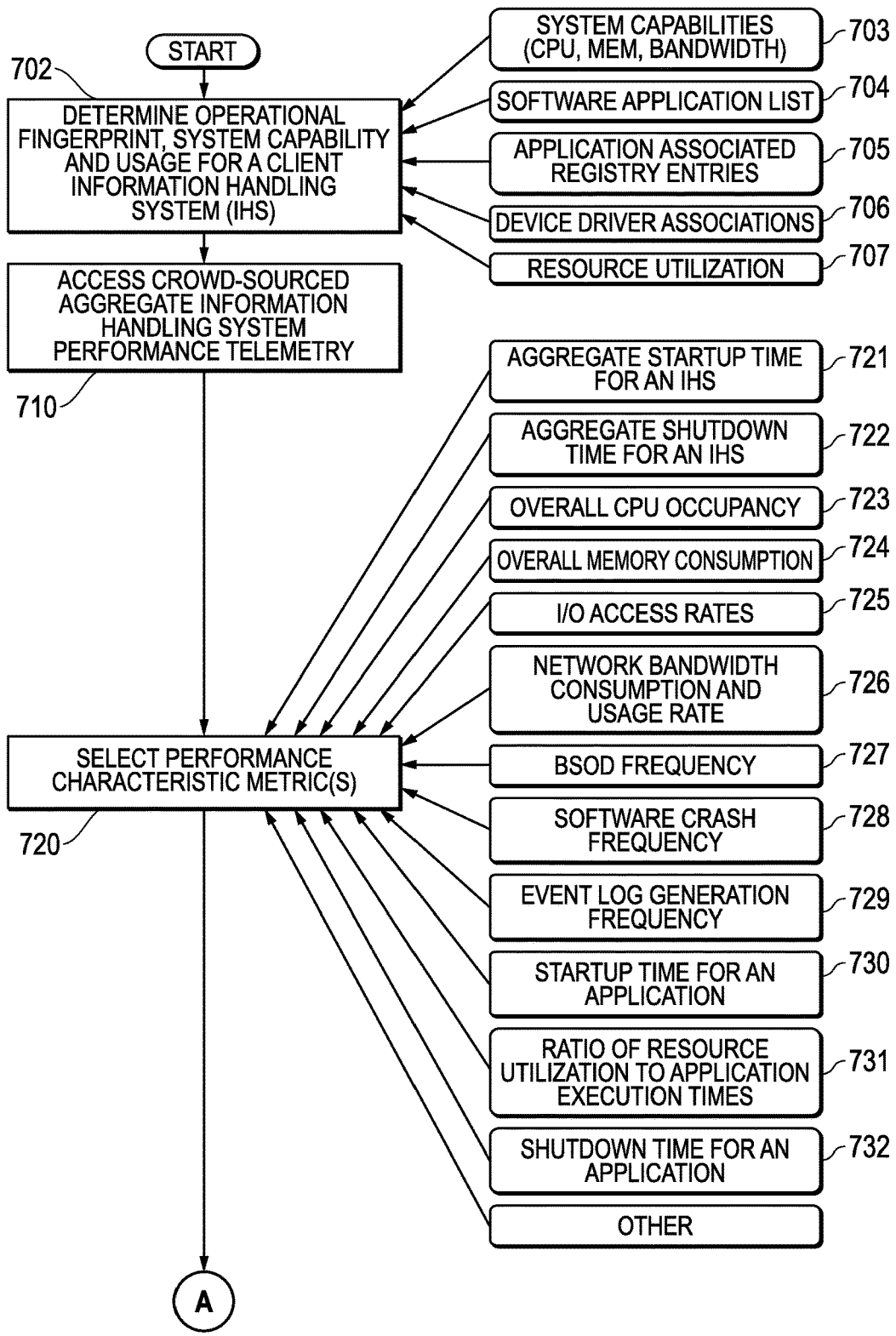
FIG. 7A is a flow diagram illustrating a another method of information handling system abnormal operation determination according to an embodiment of the present disclosure.
Figure 7B:
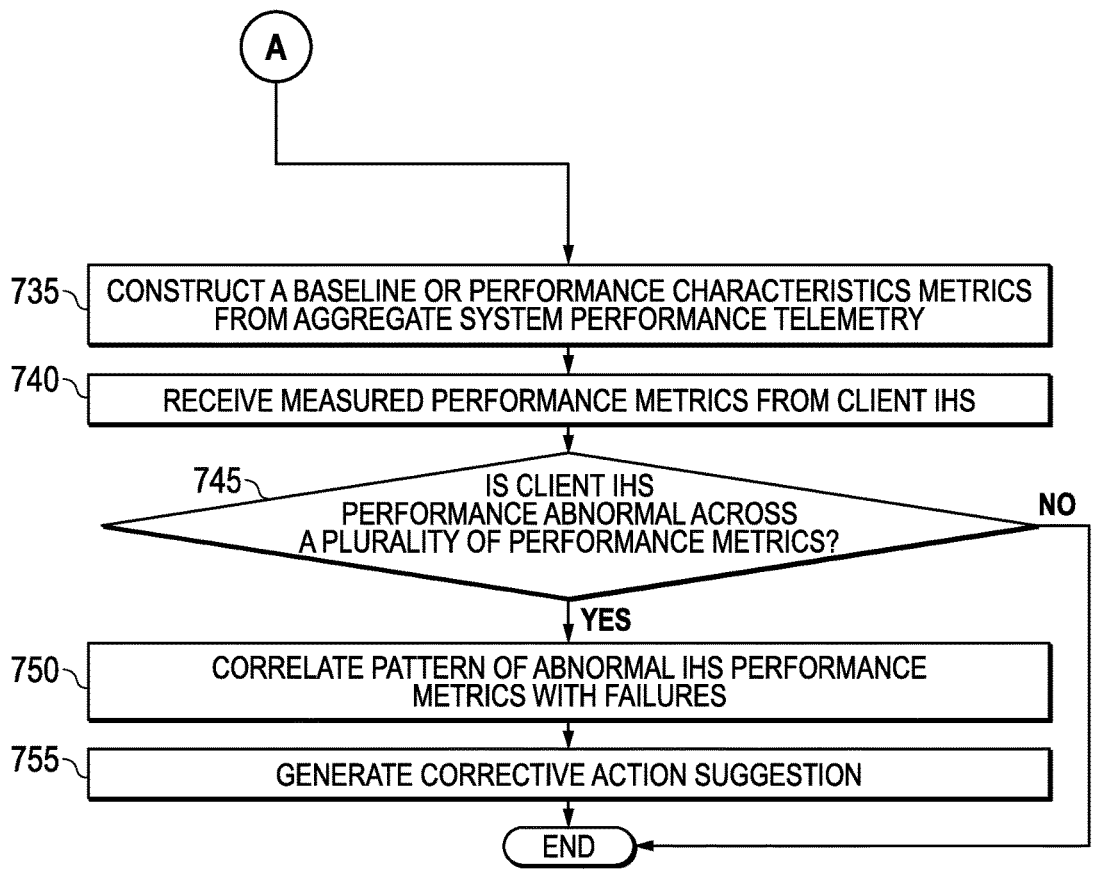
FIG. 7B is a flow diagram illustrating a continuation of another method of information handling system abnormal operation determination of FIG. 7A according to an embodiment of the present disclosure.

FIGS. 7A and 7B are a flow diagram illustrating another method of operation of an information handling system diagnostic platform for one or more client information handling systems using crowd-sourced baseline data received from across a plurality of contributing information handling systems. As before, the client information handling systems may also be contributing information handling systems and may be associated with a group or enterprise according to an embodiment of the present disclosure.

The method begins in block 702. In block 702, mapping and association data yielding an operational fingerprint is determined for a client information system undergoing analysis. The operational fingerprint may include a software inventory 704, application-associated registry entries 705, device driver associations of software applications 706, files used with software applications, and libraries used by software applications, processes, threads, and services of the software applications, or network ports and hardware associated with the software applications 707. In some embodiments, client information handling system hardware capabilities of the information handling system 703 such as CPU, GPU, memory capacities, I/O and network bandwidths among others may be determined. Any or all of these mapping and association data types may be determined separately, collectively, or in any combination. An example of software inventory and mapping is shown in more detail in an example embodiment of FIG. 9. The mapping and association data may also include other data related to the software inventory and the state of the client information handling system. The mapping and association data for the client information handling system may be used to determine a mapping classification for the client information handling system.

Examples of mapping classification M1 and M2 determined by an intelligent configuration management system for the information handling system diagnostics platform are shown above in TABLE 1 and TABLE 2 respectively.

Different software or firmware inventories or different mappings and associations to drivers, files, libraries, registry entries, processes, threads, services, network ports, or hardware by the client information handling system software applications may put the client information handling system into other mapping classifications. For example, an additional software application added to the above mapping classification M1 of TABLE 1 would yield a new mapping classification in some embodiments such as the mapping classification M2 of TABLE 2 above. In a further example embodiment, an operating automated storage back-up software with its own mapping to drivers, files, libraries, registry entries, processes, threads, services, network ports, or hardware would yield a new mapping classification. Changing other aspects of the software inventories or mappings and associations of the software applications such as with updates and the like may then alter the mapping classification applied to a client information handling system.

Upon determination of a mapping classification of the client information handling system undergoing the diagnostic process, the information handling system diagnostic platform proceeds to 710. The information handling system diagnostic platform accesses crowd-sourced aggregate telemetry for information handling system performance characteristics. The intelligent configuration management system and information handling system diagnostic platform link to aggregate performance characteristic telemetry data in a monitoring system data repository. The aggregate performance characteristic telemetry data may be selected by mapping classification. One or more mapping classified contributing information handling systems will have previously reported measured data reports for performance characteristics to the monitoring system data repository. As explained above, this may also include crowd sourced contributions of performance characteristic telemetry data from the client information handling system under diagnostics. In some aspects, data for such crowd-sourced performance characteristic measurements may be drawn from a plurality mapping categories that are similar in some mapping and association aspects for some embodiments. Thus, the crowd sourced data for performance characteristic telemetry will be selected based on relatedness to a client information handling system undergoing diagnostics.

In one embodiment, a population of contributing information handling systems may be those under control of an enterprise or other organization. In such an example embodiment, many of enterprise contributing information handling systems may have similar mapping and association data yielding similar operational fingerprints. Thus, data from similar mapping classified enterprise systems may be particularly useful in determining baseline performance levels in the embodiments described further herein.

At 720, the information handling system diagnostic platform may select at least one performance characteristic measurement from the mapping classification crowd-sourced performance telemetry data. Numerous example performance characteristics may be tracked by the intelligent configuration management system across a population of contributing information handling systems.

In the present embodiment, the information handling system diagnostic platform may select from among several performance characteristic telemetry data metrics. Those performance characteristic telemetry data metrics may include aggregate startup times 721, aggregate shut down times 722, overall CPU occupancy or utilization 723, overall memory consumption or utilization 724, I/O system access rates and latencies 725, network bandwidth consumption and traffic levels or speed 726, BSOD crash frequency 727, software application crash frequency 728, event log generation frequency 729, software application start up time 730, ratio of resource utilization to application execution times 731, shut down time for software applications 732, among other described herein or understood by those of skill. For example, other performance characteristic telemetry data metrics may include any hardware resource utilization levels including processor utilization, memory utilization, I/O utilization, or network adapter bandwidth utilization may serve as performance characteristic telemetry data metrics. These hardware resource utilization levels may be overall operational level measurements in some embodiments and may be linked to active software applications running on information handling systems in other embodiments. In addition, any or all such performance characteristic telemetry data measurements may be assessed and combined in any way such as the ratio of resource utilization to application execution times 731 to yield a performance characteristic telemetry data metrics for use with the information handling system diagnostic platform.

The performance characteristic telemetry data metrics may be in the form of median or average measurement levels reported from each contributing information handling system. In other embodiments, the performance characteristic telemetry data metrics may be a population distribution of measured startup times for each contributing information handling systems.

FIG. 7B is a continuation flow diagram from FIG. 7A illustrating a method of operation of an information handling system diagnostic platform for one or more client information handling systems using crowd-sourced baseline data. At 735, the information handling system diagnostic platform may establish a baseline of performance for the one or more performance characteristic telemetry data metrics selected at 720. The information handling system diagnostic platform will assess the measured performance characteristic telemetry data from the mapping categorization or mapping categorizations that closely correspond to the client information handling system undergoing diagnostics. A population distribution may be generated from the crowd sourced data for the performance characteristic telemetry data metric selected. In an example embodiment, a population distribution may be generated from the average or median data points reported for the performance characteristic telemetry data metric from each contributing information handling system. In another example embodiment, an average may be taken of a plurality population distributions reported for a performance characteristic telemetry data metric from each contributing information handling system. This average of several individual population distributions may yield an aggregate performance characteristic telemetry data metric population distribution.

The aggregate performance characteristic telemetry data metric population distribution may serve as the baseline reference for behavior of the performance characteristic. In one aspect, the population distribution of aggregate performance characteristic telemetry data metrics may be a statistically bounded population distribution having a boundary based on high data confidence levels. A confidence interval may be used, such as a one-sided upper 90%, 95%, or 99% confidence bound in an example embodiment. The aggregate population distribution provides for assignment of operational percentile levels to individual data points within the population distribution of aggregate performance characteristic telemetry data metrics.

In other embodiments, based on the population distribution, a baseline level may be selected. For example, the baseline may be selected as an operational percentile determined acceptable for a performance characteristic telemetry data metric. For example, system boot times at the $75^{th}$ percentile may be 40 seconds in an embodiment, and at or below 75% are acceptable boot times for a mapping classified information handling system and may serve as a baseline. In other example embodiments, a baseline may be established as a mean or median performance characteristic telemetry data metric value for mapping classified information handling systems from the aggregate population distribution. Similarly, a value relative to the mean or median value may serve as a baseline instead. Selection rules for baseline values, as well as selection of learned thresholds for abnormal behavior determination, may be defined based on desired level of sensitivity for the information handling system diagnostic platform. An example of a baseline determination of data for a performance characteristic telemetry data metric is shown above in TABLE 3.

The information handling system diagnostic platform may also determine a learned threshold of abnormal operational behavior with respect to the baseline performance characteristic telemetry data metrics. The threshold is used to indicate abnormal behavior for a measured performance characteristic telemetry data metrics. In one embodiment, the learned threshold may a threshold determined from trends in reported performance characteristic telemetry data metrics that may lead to or be associated with failures or other operational abnormalities such as security issues or software collisions.

The threshold indicating abnormal operation based on the aggregated population distribution for a performance characteristic telemetry data metric may be determined in several ways. It may be assigned based on recognized trends at a particular high or low threshold value. It may be set by an IT administrator. In one example embodiment, the information handling system takes a mean or median of the distribution of performance characteristic telemetry data metrics and determines a deviation spread amount from the mean or median value. The deviation bar may be bounded on one end, for example at the high end, at an operational percentile level, for example a $75^{th}$ percentile, may be selected as threshold above which a performance characteristic telemetry data metric is designated as abnormal behavior. In yet other embodiments, a threshold to indicate abnormal client information handling system operation may be the confidence interval may be used for the aggregate distribution of the performance characteristic telemetry data metric. For example, a one-sided upper 90%, 95%, or 99% confidence bound, may establish the performance characteristic telemetry data metric deviation threshold indicating abnormal behavior when outliers are detected above this level at the high end of the data distribution. An operational percentile boundary (or interval) may be applied at any level in the data distribution and may serve as a high or low threshold boundary. The ruled for determining a learned threshold level determination may depend on desired sensitivity of the information handling system diagnostic platform for determining abnormal operation. In yet other embodiments, thresholds may be set by actual values for performance metrics set by an IT administrator for the information handling system diagnostic as described above. For example, a set threshold limitation for application start up time may be set at 10 seconds, above which behavior is deemed abnormal. Such actual value set thresholds may be based on usability studies determining thresholds at which performance characteristics typically trigger user annoyance.

Proceeding to 740, the information handling system diagnostic platform receives measured system telemetry data for a performance characteristic from the client information handling system under diagnostics for health of operation. In some embodiments, a mean or median of several performance characteristic measurements may be received from the client information handling system under diagnosis as with the data reported from contributing information handling systems. In other embodiments a single measurement may be used or a distribution of measurements from the client information handling system may be received.

The information handling system diagnostic platform determines abnormal operation performance behavior at decision diamond 745. In one aspect, an operational percentile for a performance characteristic telemetry data metric may determined for a client information handling system from the received measured system telemetry data for a performance characteristic. By comparison of the measured performance characteristic received from a client information handling system to the aggregate baseline population distribution, the operational percentile within the distribution may be determined as described. At decision diamond 745, the information handling system diagnostic platform may determine whether the operational percentile falls outside of a threshold deviation level established for the performance characteristic telemetry data metric.

For example in one embodiment, overall memory occupancy may be measured for a client information handling system at the $60^{th}$ percentile relative to the aggregate population distribution. As such, the performance metric of overall memory occupancy may be operating within a normal or reasonable range for mapping classified information handling system. In another example, software application shut down time may be operating at the $95^{th}$ percentile indicating a potential abnormal behavior if this falls outside a deviation threshold. In an example, the deviation threshold may be established at $90^{th}$ percentile.

In the above example embodiment, the memory utilization occupancy or other performance characteristic telemetry data metric at the $60^{th}$ percentile in the aggregate data distribution likely does not fall outside a threshold deviation. In one aspect, memory occupancy would have to exceed an operational percentile threshold of $90^{th}$ percentile to trigger an indication of abnormal operation. If the measured performance characteristic telemetry data metric does not fall outside a deviation threshold for abnormal behavior, then the process may end at this point for the assessed performance metric. It is understood, that the information handling system diagnostic system may determine operational percentiles and assess abnormal operation for a plurality of performance characteristic telemetry data metrics for a client information handling system using the above method in some embodiments. In other aspects, the information handling system diagnostic platform may provide an ongoing or periodic monitoring of some or all performance characteristic telemetry data metrics for a client information handling system.

In the above example embodiment where a performance characteristic telemetry data metric is at the $95^{th}$ percentile and the threshold deviation is set at a lower level, such as $90^{th}$ percentile or lower, the information handling system diagnostic platform will determine that abnormal operational performance is detected for the performance characteristic telemetry data metric.

If abnormal operation performance is determined for performance characteristic telemetry data metric, the information handling system diagnostic platform may proceed to provide an indication of such abnormal operational behavior. In one aspect, the method proceeds to 750 where a determination of abnormal behavior one or more performance characteristic telemetry data metrics is used to predict a failure or assess a cause of the abnormal performance. The information handling system diagnostic platform may correlate a pattern of abnormal operational performance by one or more performance characteristic telemetry data metrics with reported or known failures from the crowd sourced data or that are set up as rules indicating failures may occur. In another example embodiment, correlation of patterns of abnormal operational performance by one or more performance characteristic telemetry data metrics may be associated by the information handling system diagnostic platform with certain causes of these performance issues. For example, a slow boot time and a slow start up time for one or more software applications may pinpoint a cause of the slow boot time with a software application or a collision between two software applications at boot up of the client information handling system. In another example, a very high memory utilization level during execution of one or more software applications may indicate a memory leak level having tied up substantial memory resources unnecessarily. In another example, very high memory usage via 110 bus memory access plus an indication that multiple anti-virus or multiple backup software is currently running may indicate a collision of software application over memory resources.

In an example embodiment, the correlation between indicators of abnormal behavior and potential failures is a rules based system applying general knowledge from usage studies or specific rules developed from statistical data for performance indicators corresponding to recorded failures. In some aspects, observance of abnormal operational performance may lead to establishment of general guidelines. For example, monitoring determines one or more applications with high I/O utilization are running concurrently. With this data, including abnormally high I/O utilization, the information handling system diagnostic platform may alert the user that there is potential for poor performance and include the names of the applications. In another example embodiment, the information handling system diagnostic platform may determine startup time has slowed to an abnormal level. The information handling system may search for one or more applications also having the largest start up time and alert the user to the potential for poor performance using the name(s) of the slow applications found. In yet other aspects, a non-performing application such as one with abnormal operation performance for application start-up, instruction execution, or application shutdown times may indicate non-performance of the software application. The information handling system diagnostic system may identify the poorly performing software application and recommend downloading an updated application if available. These are but some examples of the correlation of abnormal operation performance indicators with issues of at the monitored information handling system. It is appreciated other correlations between indication of one or more abnormal operational performance metrics and potential issues may be implemented.

Once a potential failure or operational issue is diagnosed, the information handling system diagnostic platform may access a database of recommended corrective actions associated with an identified operation issue or failure. In the above example, the slow start up software application may be recommended for removal or to adjust settings to avoid start up upon system booting. In other example embodiments, recommended setting adjustments may be recommended for the pinpointed software application. In yet other examples, restarting a memory leaking program, memory reformatting, or memory upgrading may be recommended. In another aspect, the information handling system diagnostic system may apply established specific remedies to apply an established knowledge base, such a usability studies, to known solutions. For example, slow information handling system startup may be attributable to a change in a system operational parameter that has been seen before. The information handling system may apply a known solution.

In applying the knowledge base of potential recommended solutions to known issues, a confidence rating may be used. To illustrate in an example, a slow startup attributable to an identified application has been seen before as linked to several issues with several potential remedies. Issue 1/Remedy 1 may have an 80% confidence rating, Issue 2/Remedy 2 may have a 50% confidence rating, and Issue 3/Remedy 3 may have a 30% confidence rating. Each confidence rating may be based on application of a matrix of performance characteristic measurements. With more of the performance characteristics indicating a issue, a higher confidence level may be applied in an example embodiment.

To apply a remedy, a system may have remedies applied and then take performance characteristic measurements to see if an issue has resolved. For example, the system can apply Remedy 1, then check for improvement, and if needed apply Remedy 2, then check for improvement, and if needed apply Remedy 3, then check for improvement. In other aspect, the information handling system diagnostic platform may apply Remedy 1, Remedy 2, and Remedy 3 in any order and check for improvement after application of all three in other embodiments. Success status of a remedy can be fed back to the confidence ratings of the remedies for the information handling system diagnostic platform. Permutations of these are possible, e.g. a general guideline for startup sluggishness with a set of potential remedies each of which have a confidence rating.

Figure 8:
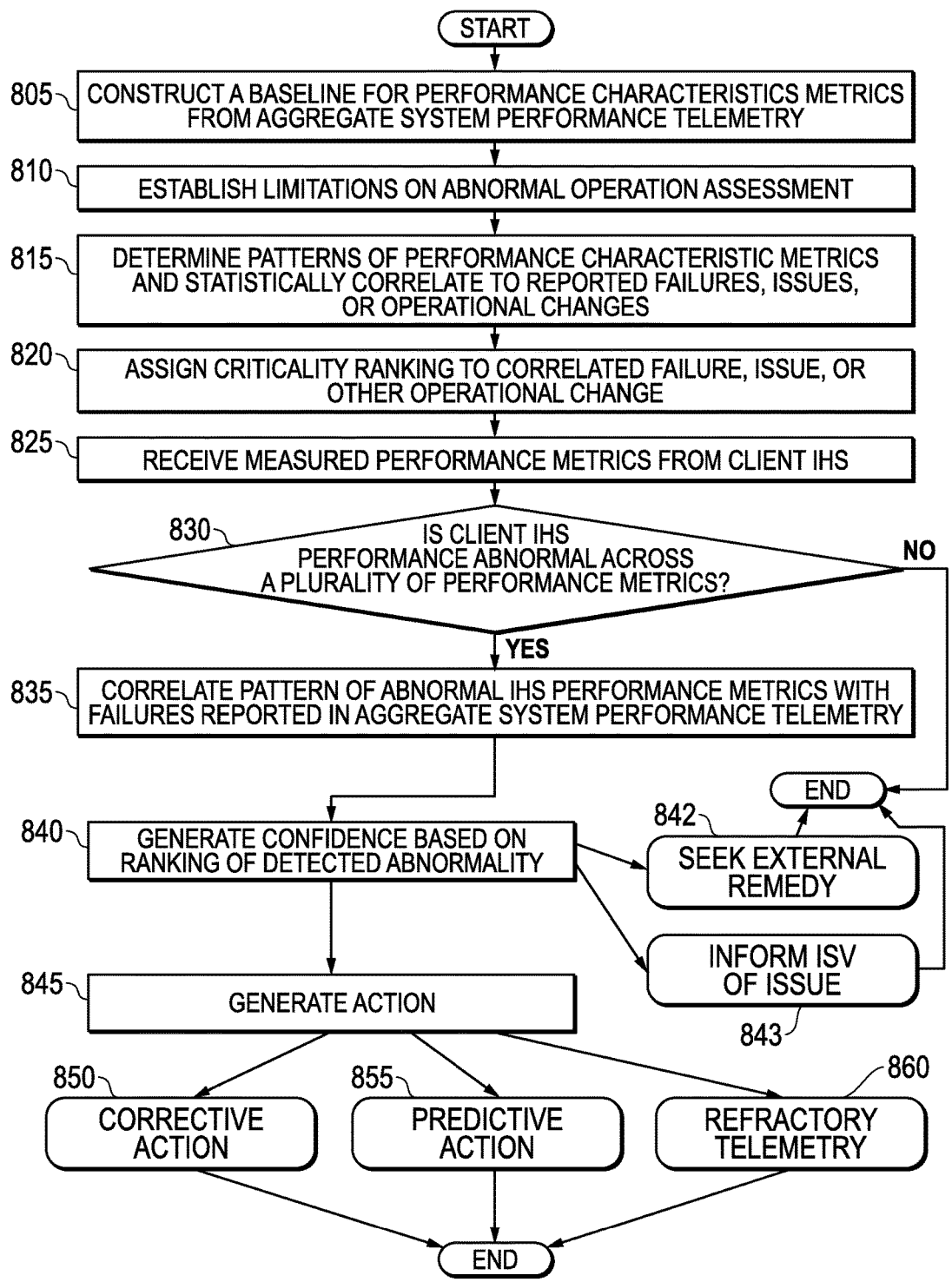
FIG. 8 is a flow diagram illustrating a method of information handling system abnormal operation determination and mitigation according to an embodiment of the present disclosure.

FIG. 8 is a flow diagram illustrating another method of operation of an information handling system diagnostic platform for one or more client information handling systems under diagnosis. The flow begins at 805 where the information handling system diagnostic platform constructs a baseline for one or more performance characteristic telemetry data metrics. This may be done in accordance with embodiments described herein. Proceeding to 810, the information handling system diagnostic platform may also establish deviation thresholds indicating abnormal operation for the one or more performance characteristic telemetry data metric. Again, this aspect may be conducted according to one or more embodiments of the present disclosure.

At 815, the information handling system diagnostic platform determines patterns from the crowd sourced performance characteristic telemetry data by statistical correlation of those performance characteristic telemetry data metrics with reported failures, operational issues, or operational changes.

The information handling system may assign criticality rankings to corresponding failures, operational issues, or other operational changes. Criticality rankings may be based on frequency of failure occurrences or how far beyond a deviation threshold of abnormal behavior a performance characteristic telemetry data metric or metrics may fall. The more frequent a failure or the more severe the abnormal performance behavior, the higher the criticality ranking assigned. In another aspect, abnormal behavior leading to system or software failures may be ranked more highly than operation issues that nonetheless do not impact operation of a client information handling system. In one example embodiment, criticality ranking values may be assigned. If a predicted failure a BSOD failure, the criticality ranking may be highest out of a ranking scale, for example a 10 out of 10. If a predicted failure is a software failure, a similarly high criticality ranking, for example a 9 out of 10, may be assigned. If boot times are exceedingly low or CPU consumption is exceptionally high and fall far outside the deviation threshold, a higher ranking may apply to these abnormal operational performance issues. For example, extremely slow boot times or extremely high CPU consumption may yield a criticality ranking of 5 or 6 but may be a function of how far outside an abnormal operation threshold has been measured. Some performance metrics may receive lower criticality rankings such as those not likely to be noticed or to impact a user of the client information handling system.

Proceeding to 825, the information handling system diagnostic platform receives measured system telemetry data for a performance characteristic from the client information handling system under diagnostics for health of operation. This may be done in accordance with embodiments of the present disclosure. The information handling system diagnostic platform determines abnormal operational performance behavior at decision diamond 830. When measured performance characteristic telemetry received from a client information handling system falls outside a deviation threshold for abnormal behavior, this designates abnormal operation in accordance with further embodiments of the present disclosure. If no abnormal behavior is determined at 830, the flow may end. If abnormal behavior is detected for one or more performance characteristic telemetry data metrics, flow proceeds to 835.

At 835, the information handling system diagnostic platform may correlate the determination of abnormal behavior for one or more performance characteristic telemetry data metrics with failures or causes operational performance issues reported in aggregate system telemetry data or known to occur. This correlated pattern of abnormal behavior is used to predict a failure or to assess a cause of the abnormal operational performance.

Proceeding to 840, the information handling system diagnostic platform may assign confidence values to the determined diagnosis of predicted failures or operational performance issues. The confidence values may be based on closeness of the statistical correlation with a pattern of abnormal behavior or one or more performance characteristic telemetry data metrics leading to failures or causes of operational abnormality. In other aspects, the confidence values may be influenced by the severity of the measure abnormality in the performance characteristic telemetry data metric or metrics. In yet other aspects, indication of abnormal operational performance across multiple performance characteristic telemetry data metrics may lend to increased confidence assignment to the detected abnormality and corresponding predicted failure or cause. At this stage, the information handling system diagnostic platform may generate an indicator of the abnormal operational performance as described in various embodiments of the present disclosure. Additionally, the information handling system diagnostic platform may generate an indicator of a predicted failure or cause of operational performance abnormality. Flow may proceed to 842 where a user or IT manager may be informed and an external remedy may be sought. In some embodiments of 842, an external remedy may involve an automated search for an external remedy available via network connection such as a software patch or software update. Flow may also proceed to 843 in some embodiments whereby notification of abnormal operation performance of one or more performance characteristic telemetry data metrics and the predicted failure or cause of the abnormality may be transmitted to an independent software vendor (ISV). This notification of an ISV may also seek a remedy or update for a software application that may be involved in the cause of the abnormal operation or predicted failure. After seeking a remedy or notifying an ISV, the process may end in some embodiments.

In some embodiments, flow may proceed to 845. At 845, the information handling system diagnostic platform may access a database of recommended corrective actions associated with an identified operational issue or failure.

Depending on the confidence level assigned to a predicted failure or a predicted cause of the determined abnormal operational behavior, an action may be generated in response. The type of action generated may further depend on whether the diagnosis involves a predicted failure or a predicted cause of abnormal operational behavior. Proceeding to 850, the information handling system diagnostic platform may generate a corrective action by issuing executable instructions and transmitting the same to the client information handling system exhibiting abnormal operational behavior. In another aspect at 855, the information handling system diagnostic platform may generate a predictive action, for example in anticipation of a predicted failure.

In another aspect at 860, the determination of an abnormal operation behavior of one or more performance characteristic telemetry data metrics and confidence estimates relating to correlation with a diagnosis of predicted failures or causes of abnormal operational performance may be used in refractory telemetry to the monitoring system database for the information handling system diagnostic platform. In one aspect, the refractory telemetry may provide data correlating causes of operation abnormality with detected abnormal behavior of one or more performance characteristic telemetry data metrics. In some embodiments, feedback on generated actions confirming predicted failures or confirming causes of abnormal operational performance may be used as refractory feedback telemetry. The refractory telemetry may be used, for example, to assign learned confidence levels to diagnoses for causes of abnormal performance or predicted failures.

In an example embodiment, when a corrective action fixes the abnormal operation detected refractory feedback telemetry may be used to assign a confidence value to the correlated cause and corresponding generated actions. In an embodiment for example, each refractory telemetry feedback data point confirming a cause would contribute to increasing confidence assigned to a correlated cause or corresponding action. Similarly, if a predictive action yields statistically fewer measure failures, this may be used as confirmatory refractory feedback telemetry. After corrective action 850, predictive action 855, or refractory feedback 860, the process may end.

In accordance with at least one embodiment, a host system may initiate the intelligent configuration management system code on the host device or remote data server if not already initiated. The host device or remote data servers may serve as a centralized intelligent configuration management system in an embodiment.

In accordance with at least one embodiment, the intelligent configuration management system monitors event occurrences and usage measurements for contributing information handling systems associated with a group or enterprise. As an example, intelligent configuration management system agent software located on one or more contributing information handling systems of the enterprise may take measurement of component device utilization data as part of or in connection with the information handling system diagnostic platform. This component device utilization data may include event and usage data for component devices or systems in each monitored contributing information handling system as well as for reports from contributing information handling systems to the monitoring systems data repository. Any portion of the contributing information handling systems associated with an enterprise or group may be monitored in some embodiments. In other embodiments, all contributing information handling systems associated with a group or enterprise may be monitored. Further, any or all of the contributing information handling systems associated with a group or enterprise may also be monitored as client information handling systems for diagnostic purposes by the information handling system diagnostic platform of the present disclosure. Similar measurement or assessment of a client information handling systems performance characteristics may be made as described above.

In accordance with at least one embodiment, the intelligent configuration management system may initiate a request for component device utilization data from one or more monitored client and contributing information handling systems. If a request for data has not been issued, client or contributing information handling systems continue to be monitored by the intelligent configuration management system agents and the hardware implementation monitoring and reporting systems embedded thereon. If a request is issued, component device utilization data is retrieved from one or more client or contributing information handling systems. In other embodiments, it is understood that the intelligent configuration management system agent and hardware implementation monitoring and reporting system may report component device utilization data to a monitoring system data repository at any time from a monitored information handling systems in various embodiments. For example, the intelligent configuration management system agent may report component device utilization data to the intelligent configuration management system including by its own initiation, periodic reporting, reporting triggered by an event or threshold such as detection of new data, or any combination. Thus, in some embodiments, issuance of a request for component device utilization data may not be necessary. Security measures including encryption and security verification may be deployed in the course of communications of reported component device utilization data.

In accordance with at least one embodiment, data from monitored client and contributing information handling systems is stored in a monitoring system data repository as described above. As an example, the intelligent configuration management system code will access current component device utilization data stored in the monitoring system data repository. Accessed data may include component device event and usage data as well as other component device utilization data and may be done in accordance with the present disclosure in several aspects.

In accordance with at least one embodiment, intelligent configuration management system will determine what performance characteristic parameters will be used in performance metric diagnostics and abnormal operational performance determinations described herein. The performance characteristic parameters may determine the bounds or view of performance characteristic metrics desired by the IT manager or other users of the intelligent configuration management system. The component device utilization data collected by the intelligent configuration management system and information handling system diagnostic platform is complete enough to provide a high degree of confidence in performance metric diagnostics and abnormal operational performance determinations in an embodiment. Furthermore, the completeness of the data gathered by the intelligent configuration management system permits a wide set of optional parameters to be applied to view specific aspects performance metric diagnostics and abnormal operational performance determinations in some embodiments.

Detecting abnormalities by the information handling system diagnostic platform may require generating confidence levels that behavior is abnormal for purposes of generating action, recommendations, or transmitting indicators of abnormal behavior. Statistical models that track statistical confidences for performance characteristic telemetry data may also permit IT managers to identify constraints in estimated performance based on historical event and usage data affecting performance in component device utilization data or software activity. Such statistical modeling may be used to predict performance limitations of individual components indicating potential failures by allowing prediction of usage patterns and configuration parameter settings for which such failures or other performance events may become evident. With the intelligent configuration management system, performance characteristic telemetry data association with failures or performance operation events will carry an improved degree of statistical confidence in association with actions or remedies that may be tailored to specific client information handling systems or their component devices.

The statistical model of performance characteristic telemetry data association with failures or operational performance event estimation may be determined based on several limitations placed on the data as described above. In various embodiments, a statistical model of data for events and usage may be made with respect to particularized times, seasons, locations, class or sub-grouping of information handling system, component devices, or other parsing of the gathered device component utilization data. Similarly, as shown in certain embodiments herein, a statistical model for overall events and usage affecting performance across the enterprise or other group may be conducted as well by the intelligent configuration management system. Depending on the analysis required, it is understood that the intelligent configuration management system may conduct either parametric or non-parametric statistical analysis of the data to yield a demand estimation model with substantial accuracy and confidence levels for use anticipating failures or estimating operational performance events. The parametric or non-parametric statistical model of performance may be made by the intelligent configuration manager to determine probability distributions for operational performance events or failures and performance characteristic telemetry data levels depending on availability and accuracy of statistical parameter assumptions in accordance with several understood statistical analysis techniques.

Various statistical models may be used and applied to the variety of aspects of the component device utilization data described herein. For example, in an embodiment, a non-parametric kernel density estimate model may generate a probability density function to estimate performance characteristic events or failures and performance characteristic telemetry data levels affecting performance over a given period of time among a population of client information handling systems. In another embodiment, the kernel density estimate may be applied to data for specific to types of component devices or systems in the population of client information handling systems monitored for component device utilization data and including operational performance events and failures affecting performance. Other statistical modeling may be used as is understood. For example, a parametric statistical model may be used in which an assumed performance characteristic telemetry data distribution function may be selected and the performance characteristic telemetry data is curve fit to the presumed base model in certain embodiments. Parametric models, such as normalized or lognormal parametric models, may yield additional accuracy assuming a properly selected base set of assumptions of the assumed performance characteristic telemetry data distribution over a population of client information handling systems or other aspects of component device utilization data as is understood. By statistical analysis of performance characteristic telemetry data for a plurality of client information handling systems throughout an enterprise, operation performance event or failure occurrence for the monitored client information handling system may be estimated with a reasonable certainty by the information handling system diagnostic platform. Moreover, the component device specificity of the component device utilization data allows for statistical performance estimation at a granular level for classes of performance characteristics across some or all of the enterprise.

While embodiments have been described herein with respect to specific types of client information handling system performance parameter sensors, such as power sensors, duty cycle sensors, thermal stress sensors, system storage condition sensors, mechanical stress sensors, other embodiments may be applied to other types of interfaces. For example, if it is desirable to provide other or additional types of interfaces, an embodiment using such other or additional types of interfaces may be implemented in accordance with the disclosure herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such central processor units or other processors provided by companies such as Intel®, AMD®, ARM® and others such that the software and firmware are capable of operating a relevant environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A management information handling system comprising:
    a monitoring system data repository memory device having code instructions to:
        store aggregate information handling system performance telemetry data crowd-sourced from a population of information handling systems and categorized into mapping classifications based on software application inventory and software application associations with drivers;
    an application processor executing instructions of an information handling system diagnostic platform in an intelligent configuration management system:
        to obtain aggregate information handling system performance telemetry data for a performance characteristic of information handling systems having a first mapping classification corresponding to a client information handling system, and
        to construct, at the management information handling system, a performance characteristic baseline of operation from the aggregate information handling system performance telemetry having the first mapping classification;
    the application processor receiving monitored telemetry data for the performance characteristic from the client information handling system; and
    the application processor detecting abnormal operation if the client information handling system monitored telemetry data for the performance characteristic exceeds a threshold relative to the performance characteristic baseline.

2. The management information handling system of claim 1 wherein the aggregate information handling system performance telemetry data further includes data on CPU occupancy of a software application, memory usage of the software application, and network bandwidth consumed by the software application.

3. The management information handling system of claim 2 wherein the monitored telemetry data includes data on CPU occupancy of the software application, memory usage of the software application, and network bandwidth consumed by the software application.

4. The management information handling system of claim 1 wherein aggregate information handling system performance telemetry data includes data on software application crash history.

5. The management information handling system of claim 1 wherein the software application inventory includes an operating system and the performance characteristic is a system boot time.

6. The management information handling system of claim 1 further comprising:
    the application processor determines patterns of the aggregated telemetry data corresponding to high frequency information handling system failures to set thresholds relative to the performance characteristic baselines.

7. The management information handling system of claim 1 further comprising:
    the application processor determines thresholds relative to the performance characteristic baselines from a distribution of measurements across aggregated telemetry data for one mapping classification.

8. The management information handling system of claim 1 further comprising:
    a network adapter for transmitting a dispatch ticket for support with respect to the detected abnormal operation.

9. The management information handling system of claim 1 further comprising:
    the application processor establishes confidence based rankings on detected abnormal operation to generate a corrective action.

10. A computerized method, at a management information handling system, comprising:
    executing code instructions to store, via a monitoring system data repository memory device, aggregate information handling system performance telemetry data crowd-sourced from a population of information handling systems and categorized into mapping classifications based on software application inventory and software application associations with drivers and libraries;

executing instructions, via an application processor, of an information handling system diagnostic platform in an intelligent configuration management system:

to obtain aggregate information handling system performance telemetry data for a performance characteristic of information handling systems having a first mapping classification corresponding to a client information handling system, and to construct, at the management information handling system, a performance characteristic baseline of operation from a distribution of measurements across the aggregated telemetry data for one mapping classification;

receiving monitored telemetry data for the performance characteristic from the client information handling system; and detecting abnormal operation if the client information handling system monitored telemetry data for the performance characteristic exceeds a threshold deviation relative to the performance characteristic baseline distribution of measurements.

11. The computerized method of claim 10 wherein the aggregate information handling system performance telemetry data further includes data on CPU occupancy of a software application in the software application inventory, memory usage of the software application, and network bandwidth consumed by the software application.

12. The computerized method of claim 10 wherein the monitored telemetry data includes data on CPU occupancy of a software application in the software application inventory, memory usage of the software application, and network bandwidth consumed by the software application.

13. The computerized method of claim 10 wherein aggregate information handling system performance telemetry data includes data on software application crash history.

14. The computerized method of claim 10 wherein the software application inventory includes an plurality of software applications detected and the performance characteristic is a system boot time.

15. The computerized method of claim 10 further comprising:

determining patterns of the aggregated telemetry data corresponding to high frequency information handling system failures to set thresholds relative to the performance characteristic baselines.

16. The computerized method of claim 10 further comprising:

establishing an operational percentile for detected abnormal operation within the distribution of measurements across the aggregated telemetry data for one mapping classification.

17. A computerized method, at a management information handling system, comprising:

executing code instructions to store, via a monitoring system data repository memory device, aggregate information handling system performance telemetry data crowd-sourced from a population of information handling systems and categorized into mapping classifications based on software application inventory and software application associations with drivers and libraries;

executing instructions, via an application processor, of an information handling system diagnostic platform in an intelligent configuration management system:

to obtain aggregate information handling system performance telemetry data for a performance characteristic of information handling systems having a first mapping classification corresponding to a client information handling system, and to construct, at the management information handling system, a performance characteristic baseline of operation from a distribution of measurements across the aggregated telemetry data for one mapping classification;

receiving monitored telemetry data for the performance characteristic from the client information handling system;

detecting abnormal operation if the client information handling system monitored telemetry data for the performance characteristic exceeds a threshold deviation relative to the performance characteristic baseline distribution of measurements; and transmitting, via a network adapter, an indication of the detected abnormal operation.

18. The computerized method of claim 17 further comprising:

establishing an operational percentile for detected abnormal operation within the distribution of measurements across the aggregated telemetry data for one mapping classification.

19. The computerized method of claim 17 wherein mapping classifications are based on software application inventory and based on software application associations with drivers, libraries, registries, and file types for each software application.

20. The computerized method of claim 17 wherein aggregate information handling system performance telemetry data crowd-sourced from a population of information handling systems may be stored and categorized into a second mapping classification with a different software application inventory and software application associations with drivers and libraries than the first mapping classification.

* * * * *